(12) United States Patent
Hong et al.

(10) Patent No.: US 11,054,940 B2
(45) Date of Patent: Jul. 6, 2021

(54) TOUCH SENSING DEVICE AND ELECTRICAL DEVICE WITH SLIDE DETECTION

(71) Applicant: Samsung Electro-Mechanics Co., Ltd., Suwon-si (KR)

(72) Inventors: Byung Joo Hong, Suwon-si (KR); Joo Yul Ko, Suwon-si (KR); Je Hyuk Ryu, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/903,676

(22) Filed: Jun. 17, 2020

(65) Prior Publication Data

US 2021/0089187 A1 Mar. 25, 2021

(30) Foreign Application Priority Data

Sep. 20, 2019 (KR) .................. 10-2019-0116015
Jan. 29, 2020 (KR) .................. 10-2020-0010665

(51) Int. Cl.
*G06F 3/044* (2006.01)
*G06F 3/041* (2006.01)

(52) U.S. Cl.
CPC ........ *G06F 3/04166* (2019.05); *G06F 3/0443* (2019.05)

(58) Field of Classification Search
CPC .................. G06F 3/04166; G06F 3/0443
USPC ................................... 345/170–178
See application file for complete search history.

(56) References Cited

U.S. PATENT DOCUMENTS

| | | | | |
|---|---|---|---|---|
| 8,121,283 B2* | 2/2012 | Peng | ..................... | G06F 3/0442 379/433.07 |
| 8,600,688 B2* | 12/2013 | Bills | ................... | G06F 3/03547 702/65 |
| 2002/0144886 A1* | 10/2002 | Engelmann | .......... | H03K 17/962 200/600 |
| 2003/0028346 A1* | 2/2003 | Sinclair | ................ | G06F 3/0445 702/150 |

(Continued)

FOREIGN PATENT DOCUMENTS

JP 2012-168747 A 9/2012
JP 2015-95865 A 5/2015

(Continued)

*Primary Examiner* — Tony O Davis
(74) *Attorney, Agent, or Firm* — NSIP Law

(57) ABSTRACT

A touch sensing device includes a touch switching unit including first and second touch members, an oscillator circuit generating a first oscillation signal having a variable resonant frequency based on an application of a touch to the first touch member, and generate a second oscillation signal having a variable resonant frequency based on an application of a touch to the second touch member; a detector circuit generating a first count value by converting the first oscillation signal to a first digital value, and generating a second count value by converting the second oscillation signal to a second digital value, detect an individual touch input based on the first count value and the second count value, and detect a slide touch input when a first touch input to the first touch member and a second touch input to the second touch member are detected within a predetermined slide reference time.

18 Claims, 18 Drawing Sheets

(56) References Cited

U.S. PATENT DOCUMENTS

| | | | | |
|---|---|---|---|---|
| 2007/0268265 A1* | 11/2007 | XiaoPing | G06F 3/0446 | 345/173 |
| 2008/0179112 A1* | 7/2008 | Qin | G06F 3/03547 | 178/18.06 |
| 2010/0253647 A1* | 10/2010 | Agari | G06F 3/0446 | 345/174 |
| 2011/0109572 A1* | 5/2011 | Deslippe | G06F 3/0443 | 345/173 |
| 2011/0109573 A1* | 5/2011 | Deslippe | G06F 3/0443 | 345/173 |
| 2011/0109574 A1* | 5/2011 | Cipriano | G06F 1/3203 | 345/173 |
| 2011/0109586 A1* | 5/2011 | Rip | G06F 3/03547 | 345/174 |
| 2011/0109587 A1* | 5/2011 | Ferencz | G06F 3/04812 | 345/174 |
| 2011/0113371 A1* | 5/2011 | Parker | G06F 1/3215 | 715/810 |
| 2014/0218338 A1* | 8/2014 | Kim | G06F 3/046 | 345/174 |
| 2015/0130649 A1 | 5/2015 | Itakura et al. | | |
| 2017/0038897 A1* | 2/2017 | Park | G06F 3/046 | |
| 2018/0093695 A1 | 4/2018 | Hattori et al. | | |
| 2018/0120364 A1 | 5/2018 | Lee et al. | | |
| 2020/0379603 A1* | 12/2020 | Lee | G06F 3/0445 | |

FOREIGN PATENT DOCUMENTS

| KR | 2002-0077836 A | 10/2002 |
| KR | 10-2009-0120709 A | 11/2009 |
| KR | 10-2011-0087004 A | 8/2011 |
| KR | 10-2011-0087014 A | 8/2011 |
| KR | 10-2014-0100744 A | 8/2014 |
| KR | 10-2018-0046833 A | 5/2018 |
| KR | 10-1986660 B1 | 6/2019 |

* cited by examiner

TOUCH SENSING DEVICE AND ELECTRICAL DEVICE WITH SLIDE DETECTION

CROSS-REFERENCE TO RELATED APPLICATION(S)

This application claims the benefit under 35 USC 119(a) of priority to Korean Patent Application Nos. 10-2019-0116015 filed on Sep. 20, 2019, and 10-2020-0010665 filed on Jan. 29, 2020, in the Korean Intellectual Property Office, the entire disclosures of which are incorporated herein by reference for all purposes.

BACKGROUND

1. Field

The following description relates to a touch sensing device and electrical device with slide detection.

2. Description of Related Art

Typically, thin wearable devices that have a simplified form factor without mechanical switches are preferred in wearable devices. This has been accomplished by implementing a water-proofing technique and a dust-proofing technique as well as developing a device model having a smooth and integrated form factor.

Techniques such as a touch-on-metal (ToM) technique involving touching a metal element, a capacitor sensing method that implements a touch panel, a micro-electro-mechanical-system (MEMS), a micro strain gauge, and similar techniques, have been developed. Additionally, a force-touching function has also been developed.

A typical mechanical switch may be disadvantageous since the device may need a relatively large size and a large internal space to implement such a switch function. Additionally, in structures in which a switch is not integrated with an external case, the mechanical switches may result in a structure that has an externally protruding design. Accordingly, a structure that has a mechanical switch may result in an obtrusive design, and may need a large inner space.

Additionally, there may be a risk of an electric shock if direct contact is made with an electrically connected mechanical switch. Additionally, dust-proofing and water-proofing implementations may be difficult due to the structural deficiencies of mechanical switches.

It may also be desirous that the typical switch device precisely detect an impedance change caused by touch manipulation regardless of displacements of the metal case and an inner coil or a distance therebetween.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a touch sensing device includes a touch switching unit including a first touch member and a second touch member, an oscillator circuit configured to generate a first oscillation signal having a variable resonant frequency based on an application of a touch to the first touch member, and generate a second oscillation signal having a variable resonant frequency based on an application of a touch to the second touch member; and a detector circuit configured to generate a first count value by converting the first oscillation signal to a first digital value, and generate a second count value by converting the second oscillation signal to a second digital value, detect an individual touch input based on the first count value and the second count value, and detect a slide touch input when a first touch input to the first touch member and a second touch input to the second touch member are detected within a predetermined slide reference time.

The oscillator may include a first oscillator circuit including a first inductance circuit disposed in an inner side of the first touch member and configured to have a variable inductance when the first touch member is force-touched, and a first capacitance circuit disposed in the inner side of the first touch member and configured to have a variable capacitance when the first touch member is force-touched; and a second oscillator circuit including a second inductance circuit disposed in an inner side of the second touch member and configured to have a variable inductance when the second touch member is force-touched, and a second capacitance circuit disposed in the inner side of the second touch member and configured to have a variable capacitance when the second touch member is force-touched, wherein the first oscillator circuit further includes a first inductor element and a first capacitor element connected to the first inductor element and configured to generate the first oscillation signal, and the second oscillator circuit may further include a second inductor element and a second capacitor element connected in parallel to the second inductor element and configured to generate the second oscillation signal.

The device may include a substrate on which the oscillator circuit and a circuit unit including the detector circuit are mounted; and a bracket configured to support the substrate such that a predetermined distance between the first inductor element and the first touch member, and a predetermined distance between the second inductor element and the second touch member are maintained.

The detector circuit may be configured to detect the slide touch based on the first count value and the second count value when the first touch input and the second touch input are respectively detected by the first touch member and the second touch member within the predetermined slide reference time, wherein, among a preceding touch threshold and a following touch threshold for respectively determining a preceding touch input and a following touch input during the first touch input and the second touch input, the following touch threshold is lower than the preceding touch threshold.

The detector circuit may include a frequency digital converter configured to respectively convert the first oscillation signal and the second oscillation signal to digital values to generate the first count value and the second count value; and a touch detector circuit configured to detect an individual touch input or a slide touch input based on the generated first count value and the generated second count value.

The frequency digital converter may include a first frequency digital converter and a second frequency digital converter, wherein the first frequency digital converter may include: a first frequency down converter configured to divide a received reference clock and lower a frequency of the received reference clock, a first periodic timer configured to generate a first period count value by counting a first periodic time of the divided reference clock by counting with the first oscillation signal; and a first cascaded integrator-comb (CIC) filter circuit configured to generate the first count value by amplifying the first periodic count value with an accumulative gain, and the second frequency digital converter may include a second frequency down converter configured to divide the received reference clock and lower a frequency of the received reference clock, a second periodic timer configured to generate a second period count value by counting a first periodic time of the divided reference clock received from the second frequency-lowering converter by counting with the second oscillation signal; and a second CIC filter circuit configured to generate the second count value by amplifying the second periodic count value with an accumulative gain.

The touch detector circuit may include a first touch detector unit and a second touch detector unit, wherein the first touch detector unit may include: a first delay circuit configured to output a first delay count value by delaying the first count value by a predetermined period of time according to a first delay control signal; a first subtraction circuit configured to output a first differential value by subtracting the first delay count value and the first count value; and a first touch detector circuit configured to individually detect the first touch input and a slide touch input in a first direction based on the first differential value and a second differential value; and the second touch detector unit may include a second delay circuit configured to output a second delay count value by delaying the second count value by a predetermined period of time according to a second delay control signal, a second subtraction circuit configured to output a second differential value by subtracting the second delay count value and the second count value; and a second touch detector circuit configured to individually detect a second touch input and a slide touch input in a second direction based on the first differential value and the second differential value.

The first touch detector circuit may be configured to compare the first differential value with a first touch threshold and a first light touch threshold that has a value less than the first touch threshold to generate a first touch detection signal, to detect the individual touch input based on the first touch threshold, and detect the slide touch input in the first direction based on the first touch threshold and a second light touch detection signal, and the second touch detector circuit is configured to compare the second differential value with a second touch threshold and a second light touch threshold that has a value less than the second touch threshold to generate a second touch detection signal, to detect an individual touch input based on the second touch threshold and detect the slide touch input in the second direction based on the second touch threshold and a first light touch detection signal.

In a general aspect, an electric device includes a housing, a touch switching unit formed in the housing and including a first touch member and a second touch member; an oscillator circuit configured to generate a first oscillation signal having a variable resonant frequency based on an application of a touch to the first touch member, and generate a second oscillation signal having a variable resonant frequency based on an application of a touch to the second touch member; and a detector circuit configured to generate a first count value by converting the first oscillation signal to a first digital value, and generate a second count value by converting the second oscillation signal to a second digital value, detect an individual touch input based on the first count value and the second count value, and detect a slide touch input when a first touch input to the first touch member and a second touch input to the second touch member are detected within a predetermined slide reference time.

The oscillator circuit may include a first oscillator circuit including a first inductance circuit disposed in an inner side of the first touch member and configured to have a variable inductance when the first touch member is force-touched, and a first capacitance circuit disposed in the inner side of the first touch member and configured to have a variable capacitance when the first touch member is force-touched; and a second oscillator circuit including a second inductance circuit disposed in an inner side of the second touch member and configured to have a variable inductance when the second touch member is force-touched, and a second capacitance circuit disposed in the inner side of the second touch member and configured to have a variable capacitance when the second touch member is force-touched, wherein the first oscillator circuit may further include a first inductor element and a first capacitor element connected to the first inductor element and configured to generate the first oscillation signal, and the second oscillator circuit may further include a second inductor element and a second capacitor element connected in parallel to the second inductor element and configured to generate a second oscillation signal.

The device may include a substrate on which the oscillator circuit and a circuit unit including the detector circuit are mounted; and a bracket configured to support the substrate such that a predetermined distance between the first inductor element and the first touch member, and a predetermined distance between the second inductor element and the second touch member are maintained.

The detector circuit may be configured to detect the slide touch based on the first count value and the second count value when the first touch input and the second touch input are respectively detected by the first touch member and the second touch member, within the predetermined slide reference time, wherein, among a preceding touch threshold and a following touch threshold for respectively determining a preceding touch input and a following touch input during the first touch input and the second touch input, the following touch threshold is lower than the preceding touch threshold.

The detector circuit may include a frequency digital converter configured to respectively convert the first oscillation signal and the second oscillation signal to digital values to generate the first count value and the second count value; and a touch detector circuit configured to detect an individual touch input or a slide touch input based on the generated first count value and the generated second count value.

The frequency digital converter may include a first frequency digital converter and a second frequency digital converter, wherein the first frequency digital converter may include a first frequency down converter configured to divide a received reference clock and lower a frequency of the received reference clock, a first periodic timer configured to generate a first period count value by counting a first periodic time of the divided reference clock by counting with the first oscillation signal; and a first cascaded integrator-comb (CIC) filter circuit configured to generate the first count value by amplifying the first periodic count value with an accumulative gain, and the second frequency digital converter may include a second frequency down converter configured to divide the received reference clock and lower a frequency of the received reference clock, a second periodic timer configured to generate a second period count value by counting a first periodic time of the divided reference clock received from the second frequency-lowering converter by counting with the second oscillation signal; and a second CIC filter circuit configured to generate the second count value by amplifying the second periodic count value with an accumulative gain.

The touch detector circuit may include a first delay circuit configured to output a first delay count value by delaying the first count value by a predetermined period of time according to a first delay control signal, a second delay circuit configured to output a second delay count value by delaying the second count value by a predetermined period of time according to a second delay control signal, a first subtraction circuit configured to output a first differential value by subtracting the first delay count value and the first count value; and a second subtraction circuit configured to output a second differential value by subtracting the second delay count value and the second count value; and a touch detector circuit configured to individually detect the first touch input and a slide touch input in a first direction based on the first differential value and a second differential value.

The force detector circuit may be configured to compare the first differential value with a first touch threshold and a first light touch threshold that has a value less than the first touch threshold to generate a first touch detection signal, compare the second differential value with a second touch threshold and a second light touch threshold that has a value less than the second touch threshold to generate a second touch detection signal, and detect an individual touch input based on the first touch threshold and the second touch detection signal, detect the slide touch input in the first direction based on the first touch threshold and a second light touch detection signal, and detect the slide touch input in the second direction based on the second touch threshold and a first light touch detection signal.

In a general aspect, a method includes receiving touch inputs at a first touch member and a second touch member, generating a first oscillation signal and a second oscillation signal based on the received touch inputs, generating a first count value and a second count value respectively based on the first oscillation signal and the second oscillation signal, detecting an individual touch based on the first count value and the second count value; and detecting a slide touch input based on a detection of touch inputs to the first touch member and the second touch member within a predetermined slide reference time.

The method may further include recognizing a first slide touch input based on a first touch detection signal from a first touch detector and a second light touch detection signal from a second light touch detector, and recognizing a second slide touch input based on a second touch detection signal from a second touch detection signal and a first light detection signal from a first light touch detector.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
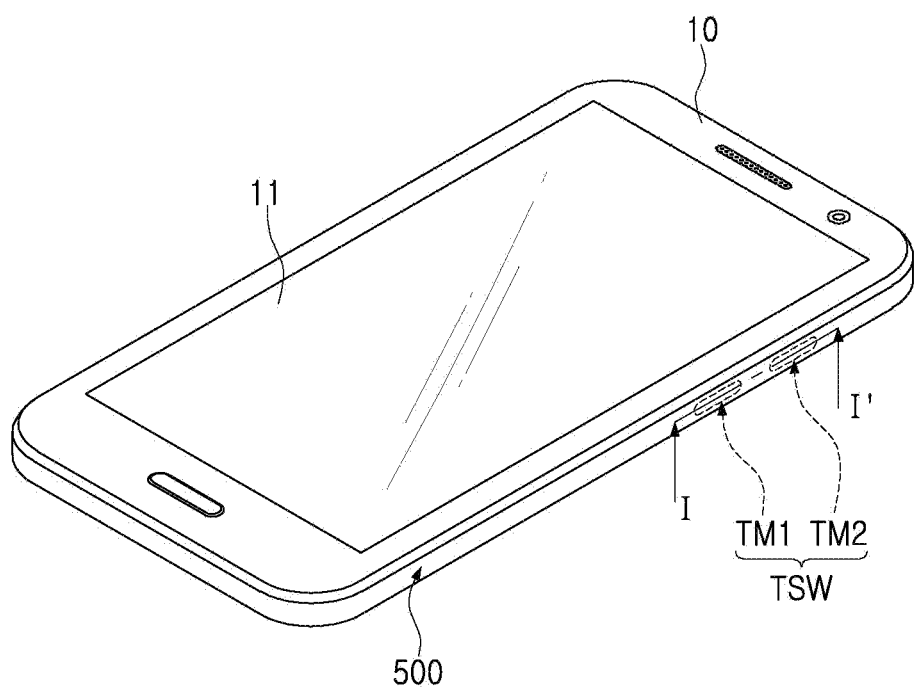
FIG. 1 illustrates an example of an exterior of an example electric device, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In an example embodiment, a slide touch input that implements not only an individual touch input using two touch members included in a touch switching unit, but also two consecutive touch operations are disclosed.

FIG. 1 illustrates an example of an exterior of an example electric device, in accordance with one or more embodiments.

Referring to FIG. 1, an electric device 10, to which the present disclosure may be applied, may include a touch screen 11, a housing 500 and a touch switching unit TSW.

The touch switching unit TSW may include a first touch member TM1 and a second touch member TM2 that replace a mechanical button. Although only a first touch member TM1 and a second touch member TM2 are illustrated, this is only an example, and the touch switching unit TSW may include additional touch members. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Referring again to FIG. 1, the electric device 10 may be, as non-limiting examples, a portable device such as a smartphone, or the like, or a wearable device, such as a smartwatch, but is not limited to a particular device and may be a portable or wearable electric device or an electric device having a switch for operation control.

The housing 500 may be an outer case of the electric device 10 that is exposed to an exterior environment. In an example in which the touch sensing device is implemented in a mobile device, the housing 500 may be a cover disposed on a side (side surface) of the mobile device. In an example, the housing 500 may be integrally configured with, or separately configured from, a cover disposed in a rear surface of the electric device 10.

The touch switching unit TSW may be disposed in the housing 500 of the electric device, but is not limited thereto. The touch sensing device may be disposed in the housing. Based on FIG. 1, the touch switching unit TSW may be disposed in a cover of the electric device, and in this example, may be a cover which may be formed in a cover, for example, a side cover, a rear cover, a portion of a front surface, excluding the touch screen. For convenience of description, an example in which the touch switching unit TSW is disposed in the side cover of the mobile device, is described as a housing, but is not limited thereto.

The touch switching unit TSW may refer to a touch region that is formed in an integral manner with the housing 500, and may include at least two touch members for sensing a touch or a force involving a force or touch application.

As used herein, the terms "touch," "touch input" and "touch application" include a contact touch, a contact not involving a force applied to an outer side surface of a first touch member and/or a second touch member, and a force touch, a contact involving a force application.

Accordingly, the term "touch" in the present disclosure can be understood as a contact or force application.

With respect to the drawings, unnecessarily repeated descriptions of the components having the same reference numerals and functions may be omitted, and details of possible differences may be described for each drawing.

Figure 2:
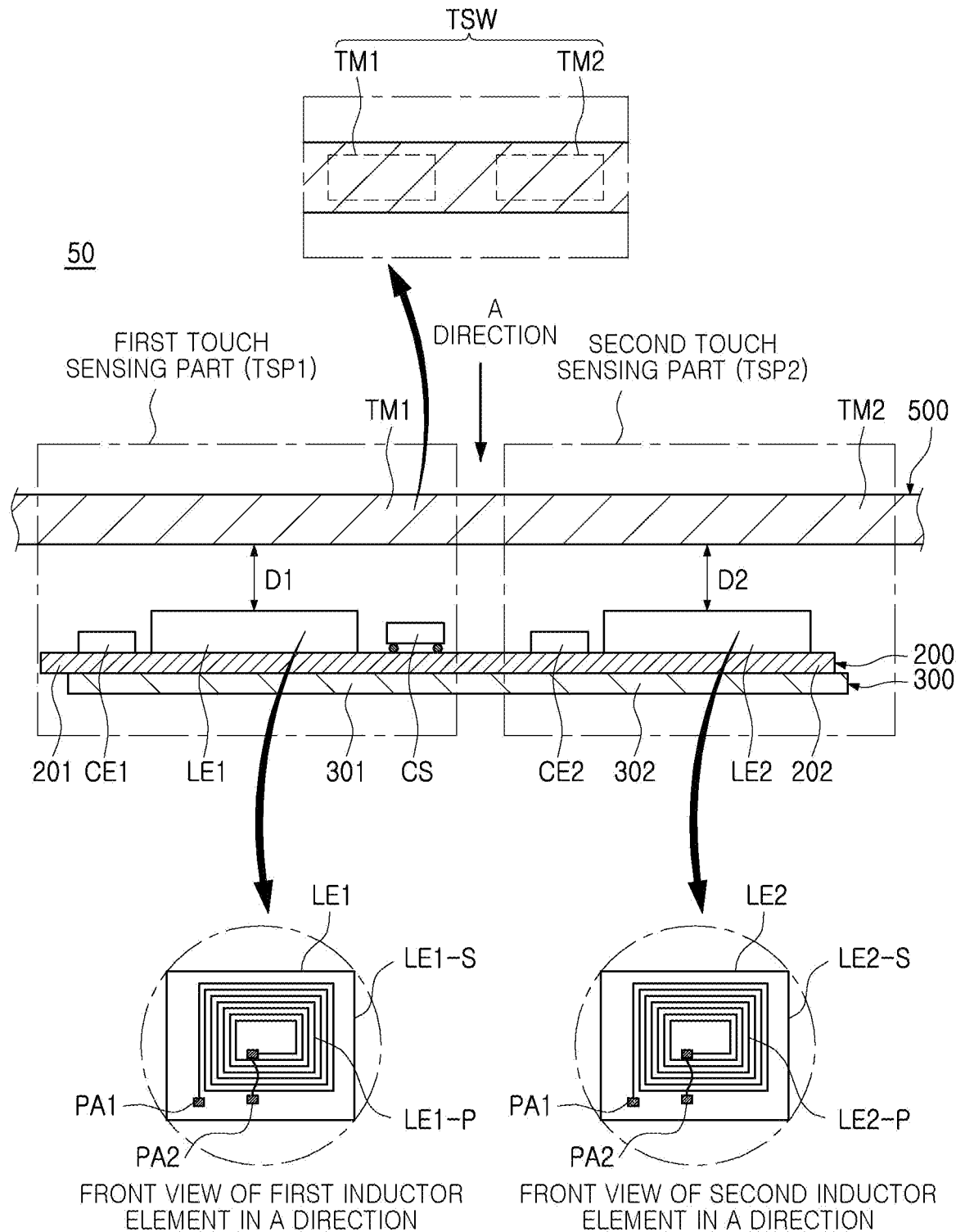
FIG. 2 illustrates an example cross-sectional diagram taken along line I-I' in FIG. 1.

FIG. 2 is an example of a cross-sectional diagram taken along line I-I' in FIG. 1

Referring to FIG. 2, an electric device according to an example may include a first touch sensing part TSP1, and a second touch sensing part TSP2.

In an example, the first touch sensing part TSP1 may include a first touch member TM1 formed in a housing 500 of the electric device 10, a first inductor element LE1 disposed on an inner side of the first touch member TM1 while being spaced apart from the first touch member TM1 by a predetermined distance (e.g., D1), and having a variable inductance when a force or touch is applied to the first touch member TM1, a first capacitor element CE1 connected in parallel, in series, or in series and parallel with the first inductor element LE1, and a circuit unit (e.g., IC) that generates a first oscillation signal having a variable resonant frequency based on the first inductor element LE1. The first touch sensing part TSP1 may acknowledge a first touch input based on the first oscillation signal.

The second touch sensing part TSP2 may include a second touch member TM2 formed in the housing 500 of the electric device 10, a second inductor element LE2 disposed on an inner side of the second touch member TM2 while being spaced apart from the second touch member TM2 by a predetermined distance (e.g., D2) and having a variable inductance when a force or touch is applied to the second touch member TM2, a second capacitor element CE2 connected in parallel, in series or in series and parallel with the second inductor element LE2, and a circuit unit (e.g., IC) that generates a second oscillation signal having a variable resonant frequency, based on the second inductor element LE2. The second touch sensing part TSP2 may acknowledge a second touch input based on the second oscillation signal.

In a non-limiting example, the predetermined distance (e.g., D1) between the first touch member TM1 and the first inductor element LE1 may be identical to the predetermined distance (e.g., D2) between the second touch member TM2 and the second inductor element LE2. However, the predetermined distance D1 may be substantially different from the predetermined distance D2.

Referring again to FIG. 2, the touch sensing device may include a substrate 200, and a bracket 300.

In a non-limited example, the substrate 200 may be mounted with a circuit unit CS, and may include the first inductor element LE1, and the second inductor element LE2. The first inductor element LE1 may include a first oscillator circuit 601, and the second inductor element LE2 may include a second oscillator circuit 602, which will be discussed below. The first oscillator circuit 601 and the second oscillator circuit may be connected to a detector circuit 900, which will be discussed below. In an example, the substrate 200 may include a first substrate 201 mounted with the first inductor element LE1, and a second substrate 202 mounted with the second inductor element LE2.

The bracket 300 may support the substrate 200 such that the predetermined distance D1 between the first inductor element LE1 and the first touch member TM1, and the predetermined distance D2 between the second inductor element LE2 and the second touch member TM2 are maintained. In an example, the bracket 300 may include a first bracket 301 supporting the first substrate 201, and a second bracket 302 supporting the second substrate 202.

The circuit unit CS is illustrated as being mounted on the first substrate 201. However, this is only an example, and is not limited thereto. The circuit unit CS may be mounted anywhere on the substrate 200. For example, the circuit unit CS can be mounted on the second substrate 202.

The first touch sensing part TSP1 illustrated in FIG. 2 will be described. The first inductor element LE1, which is spaced apart from an inner side surface of the first touch member TM1 by a predetermined distance D1, may be mounted on one surface of the first substrate 201, and a first capacitor element CE1 and the circuit unit CS (e.g., IC) may be mounted on the one surface of the first substrate 201.

The first bracket 301 may be a conductor such as a metal, or may be attached to an internal structure of the electric device, to which the touch sensing device is applied. Alternatively, the first bracket 301 may be supported by an additional supporting member. A configuration of such first bracket 301 is not particularly limited as long as the first inductor element LE1 and the first touch member TM1 are spaced apart by a predetermined distance (D1, FIG. 2).

Additionally, the circuit unit CS (e.g., IC), the first inductor element LE1 and the first capacitor element CE1 may be disposed on one surface of the first substrate 201, and the circuit unit CS (e.g., IC), the first inductor element LE1 and the first capacitor element CE1 may be electrically connected to each other through the first substrate 201.

The second touch sensing part TSP2 illustrated in FIG. 2 will be described. The second inductor element LE2 which is spaced apart from the inner side surface of the second touch member TM2 by a predetermined distance (e.g., D2) is mounted on one surface of the second substrate 202, while a second capacitor element CE1 may be mounted on the one surface of the second substrate 202. The second bracket 302 may be attached to the other surface of the second substrate.

The second bracket 302 may be a conductor such as a metal, or may be attached to an internal structure of the electric device, to which the touch sensing device is applied. Alternatively, the second bracket 302 may be supported by an additional supporting member. A configuration of such second bracket 302 is not particularly limited as long as the second inductor element LE2 and the second touch member TM2 are spaced apart by a predetermined (D2, FIG. 2).

Additionally, the second inductor element LE2 and the second capacitor element CE2 may be disposed on one surface of the second substrate 202, and the circuit unit CS (e.g., IC), the second inductor element LE2 and the second capacitor element CE2 may be electrically connected to each other through the second substrate 202 and the first substrate 201.

In an example, the first and second substrates 201 and 202 may be individually formed, or as illustrated in FIG. 2, may be integrally formed as a single substrate 200, but is not limited thereto. In this example, the substrate 200 may be formed of a flexible printed circuit board (FPCB) and may include the first substrate 201 and the second substrate 202.

The first and second brackets 301 and 302 may be individually formed, or as illustrated in FIG. 2, may be integrally formed as a single bracket 300, but is not limited thereto.

Based on the front view of the housing in an A direction of FIG. 2, as an example, the housing 500 may be formed of a conductor such as a metal. In an example, the first and second touch members TM1 and TM2 may be integrally formed with the housing and formed of a conductor, such as the same metal, as that of the housing.

Based on the front view of the first and second inductor elements LE1 and LE2 in the A direction, for example, the first inductor element LE1 may include a coil pattern LE1-P connected in a winding type, or a winding form, between a first connection pad PA1 and a second connection pad PA2, and the coil pattern LE1-P may be a PCB pattern formed on a coil substrate LE1-S. The first and second connection pads PA1 and PA2 may be electrically connected to the circuit unit CS and the first capacitor element CE1 through the substrate 200.

Further, the second inductor element LE2 may include a coil pattern LE2-P connected in a winding type, or a winding form, between the first connection pad PA1 and the second connection pad PA2, and the coil pattern LE2-P may be a PCB pattern formed on a coil substrate LE2-S. The first and second connection pads PA1 and PA2 may be electrically connected to the circuit unit CS and the second capacitor element CE2 through the substrate 200.

The first and second inductor elements LE1 and LE2 illustrated in FIG. 2 are merely examples and thus are not limited thereto.

The first and second touch sensing parts TSP1 and TSP2 illustrated in FIG. 2 are merely examples and thus are not limited thereto.

For example, the housing of FIG. 2 may be a conductor but is not limited thereto.

With respect to the drawings, unnecessarily repeated descriptions of the components having the same reference numerals and functions may be omitted, and details of possible differences may be described for each drawing.

Figure 3:
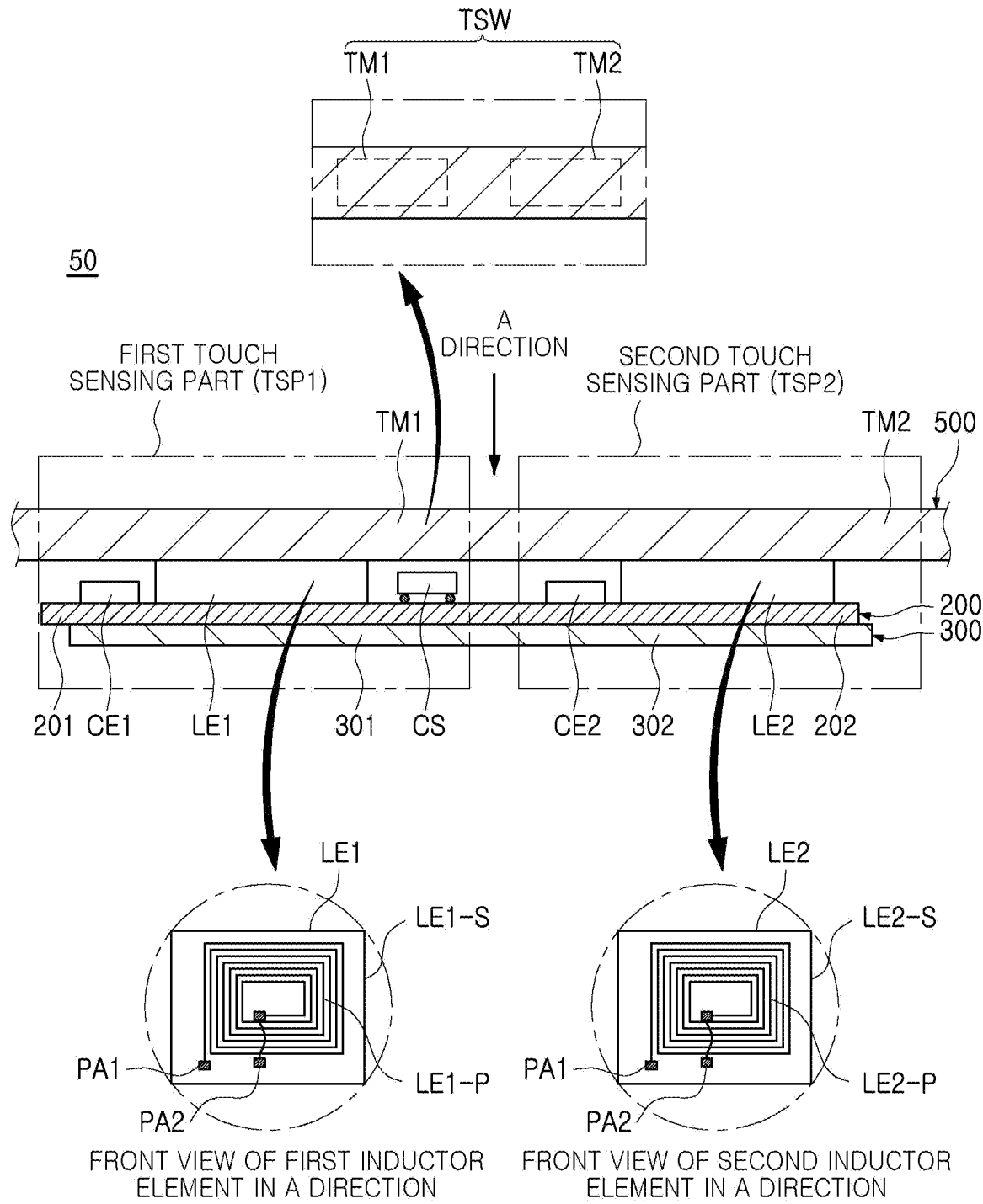
FIG. 3 illustrates an example cross-sectional diagram taken along line I-I' in FIG. 1.

FIG. 3 is another example cross-sectional diagram taken along line I-I' in FIG. 1.

The differences between the example of FIG. 2 and the example of FIG. 3 will be described. First and second touch sensing parts TSP1 and TSP2 illustrated in FIG. 3 may be different from the first and second touch sensing parts TSP1 and TSP2 illustrated in FIG. 2 in that the first and second touch sensing parts TSP1 and TSP2 illustrated in FIG. 3 may include a first inductor element LE1 disposed on an inner side surface of the first touch member TM1 and a second inductor element LE2 disposed on an inner side surface of the second touch member TM2.

Each of the first and second touch sensing parts TSP1 and TSP2 illustrated in FIG. 2 is a configuration for inductive sensing using a variable inductance that is based on a change of an eddy current according to a change in a distance between a corresponding touch member and a corresponding inductor element.

In contrast, each of the first and second touch sensing parts TSP1 and TSP2 illustrated in FIG. 3 may be a configuration for capacitive sensing using a varying capacitance that is based on a contact of a human body to an exterior surface of a corresponding touch member.

For example, the housing 500 of FIG. 3 may be a non-conductor, but is not limited thereto.

Figure 4:
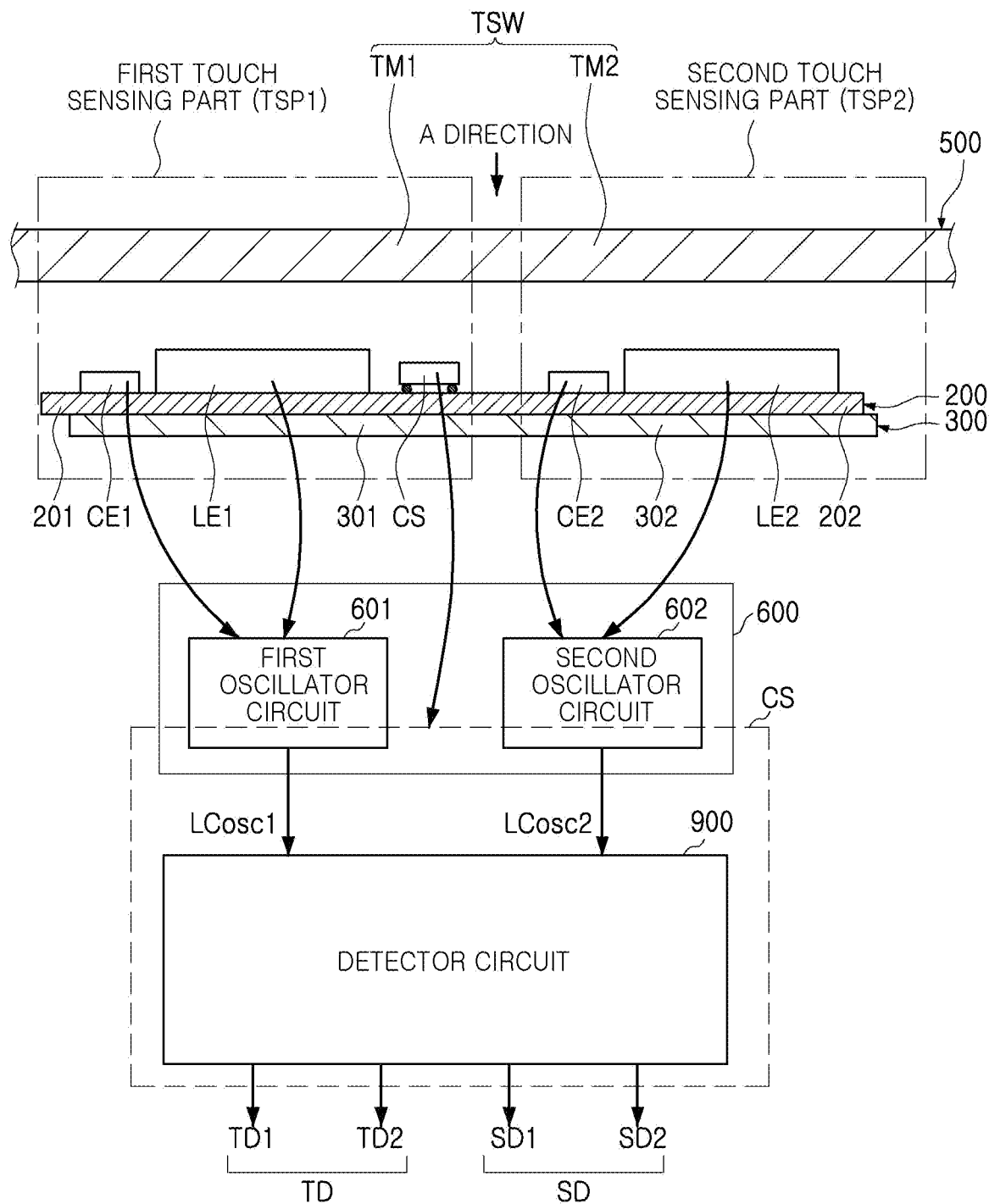
FIG. 4 illustrates an example diagram of an example touch sensing device and an example electric device, in accordance with one or more embodiments.

FIG. 4 is a configuration diagram of a touch sensing device and an electric device, in accordance with one or more embodiments.

Referring to FIG. 4, the example electric device may include a housing 500, a touch switching unit TSW having a first touch member TM1 and a second touch member TM2 that are formed in an integral manner with the housing 500 and a touch device 50.

The touch sensing device 50 may include a first inductor element LE1, a second inductor element LE2, an oscillator circuit 500 and a detector circuit 900.

In an example, the first inductor element LE1 may be disposed on an inner side of the first touch member TM1 while being spaced apart therefrom by a predetermined distance D1, and may have a variable inductance when the first touch member TM1 is force-touched. In another example, the first inductor element LE1 may be attached to an inner side surface of the first touch member TM1.

In an example, the second inductor element LE2 may be disposed on an inner side of the second touch member TM2 while being spaced apart therefrom by a predetermined distance D2 and may have a variable inductance when the second touch member TM2 is force-touched. In another example, the second inductor element LE2 may be attached to an inner side surface of the second touch member TM2.

The oscillator circuit 600 may generate a first oscillation signal LCosc1 and a second oscillation signal LCosc2, which have a resonant frequency that is based on a variable inductance or a variable capacitance.

The oscillator circuit 600 may include a first oscillator circuit 601 and a second oscillator circuit 602.

The first oscillator circuit 601 may include a first inductor element LE1 and a first capacitor element CE1 connected in parallel, in series or in series and parallel with the first inductor element LE1, thereby generating the first oscillation signal LCosc1.

The second oscillator circuit 602 may include a second inductor element LE2 and a second capacitor element CE2 connected in parallel, in series or in series and parallel with the second inductor element LE2, thereby generating the second oscillation signal LCosc2.

The detector circuit 900 may generate a first count value L_CNT1 and a second count value L_CNT2 by respectively converting the first oscillation signal LCosc1 and the second oscillation signal LCosc2 to digital values, for example, a first digital value and a second digital value, and detect a slide touch input (TD1-TD2 or TD2-TD1) when two touch inputs are present within a predetermined slide reference time (slide_det_time, SD_time) based on the first count value LCNT1 and the second count value L_CNT2. The slide reference time (slide_det_time, SD_time) is a time for distinguishing an individual touch input from a slide touch input, and may vary depending on the predetermined distance D1 between the first touch member TM1 and the first inductor element LE1, the predetermined distance D2 between the second touch member TM2 and the second inductor element LE2, utilization environment of an applied electric device, and user convenience. In a non-limiting example, the side reference time may be 0.5 μsec, but is not limited thereto.

In an example, the detector circuit 900 may detect the individual touch input based on the first count value LCNT1 and the second count value L_CNT2.

The detector circuit 900 may detect a slide touch input (TD1-TD2 or TD2-TD1) when a first touch input and a second touch input are present respectively through the first and second touch members TM1 and TM2 within the slide reference time (slide_det_time, SD_time) based on the first count value L_CNT1 and the second count value L_CNT2.

Among a preceding touch threshold and a following touch threshold for respectively determining a preceding touch input and a following touch input during the first and second touch inputs, the following touch threshold may be lower than the preceding touch threshold for smooth slide touch input and detection of the detector circuit 900.

Figure 18:
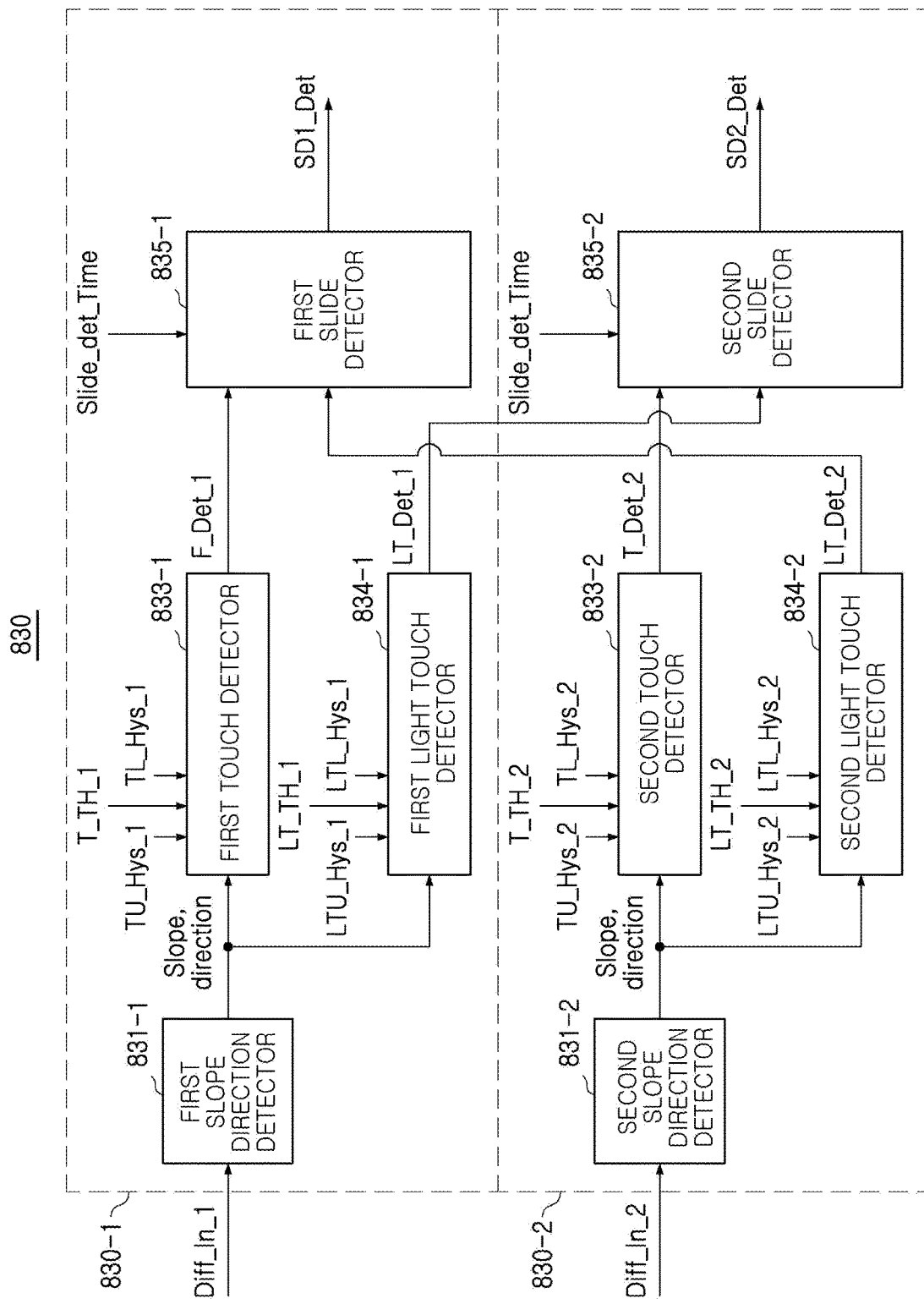
FIG. 18 illustrates an example of first and second touch detectors, in accordance with one or more embodiments.

The preceding threshold may be first and second touch thresholds (T_TH_1 and T_TH_2) of FIG. 18, while the following threshold may be first and second light touch thresholds (LTT_TH_1 and LT_TH_2).

Based on the descriptions of FIGS. 2 and 4, the first touch member TM1 in the first touch sensing part TSP1 may be formed integrally with the housing 500, and may be formed of, for example, aluminum or a metal. The first inductor element LE1 may be spaced apart from the first touch member TM1 by the predetermined distance D1 (FIG. 2) based on the first bracket 301. A ferrite sheet (not illustrated) may be disposed on a lower surface of the first inductor element LE1, which is not an essential configuration. A form of the first inductor element LE1 is not particularly defined and may be a circular or rectangular pattern or a flexible PCB (FPCB). The first inductor element LE1 may be replaced with a chip inductor.

The first substrate 201 may be, in a non-limiting example, an FPCB or any other type of PCB. On a mounting surface (e.g., a surface facing the inner side surface of the first touch member) of the first substrate 201, or a surface opposite thereto, a first capacitor element CE1, such as a multilayer ceramic capacitor (MLCC), or the like, may be disposed for sensing.

Additionally, the first substrate 201 (e.g., FPCB), on which the first inductor element LE1 (e.g., a PCB coil) and the first capacitor element CE1 (e.g., an MLCC) are disposed, may be built in the housing, and may be coupled to the first bracket 301. Accordingly, a distance between the first inductor element LE1 and the first touch member TM1 may be maintained as the distance D1 (FIG. 2), which may be predetermined by the first bracket 301.

In view of the first touch sensing part TSP1, a distance between the first inductor element LE1 and the first touch member TM1 may vary when the first touch member TM1 of the housing 500 is force-touched, which may result in a variable inductance. Accordingly, a first touch input may be sensed by the oscillator circuit 600 and the detector circuit 900.

Further, based on FIGS. 2 and 4, the second touch member TM2 in the second touch sensing part TSP2 may be formed in an integral manner with the housing 500, and may be formed of, as non-limiting examples, aluminum or a metal. The second inductor element LE2 may be spaced apart from the second touch member TM2 by the predetermined distance D2 (FIG. 2) due to the second bracket 302. A ferrite sheet (not illustrated) may be disposed on a lower surface of the second inductor element LE2. A form of the second inductor element LE2 is not particularly defined and may be, for example, a circular or rectangular pattern or a flexible PCB (FPCB). The first inductor element LE1 may be replaced with a chip inductor.

The second substrate 202 may be, as a non-limiting example an FPCB or any other type of PCB. On a mounting surface (e.g., a surface facing the inner side surface of the second touch member) of the second substrate 202 or a surface opposite thereto, a second capacitor element CE2, such as an MLCC, or the like, may be disposed for sensing.

Owing to the second touch sensing part TSP2, a distance between the second inductor element LE2 and the second touch member TM2 may vary when the second touch member TM2 of the housing 500 is force-touched, which may result in a variable inductance. Accordingly, a second touch input may be sensed by the oscillator circuit 600 and the detector circuit 900.

When the two-touch-sensing configuration is used as illustrated in FIGS. 2 and 4, not only may an individual touch input be detected, but also a slide touch input may be detected using the individual touch input.

The configuration of the touch sensing device of the examples is not limited to FIG. 2. The touch sensing device may implement the first and second brackets 301 and 302 to maintain the predetermined distance D1 between the first touch member TM1 and the first inductor element LE1, and maintain the predetermined distance D2 between the second touch member TM2 and the second inductor element LE2, thereby facilitating inductive sensing when the respective first and second touch members TM1 and TM2 are touched. Further, when a slide touch input involving consecutively touching the first and second touch members TM1 and TM2 is applied, the inductance sensing is feasible even in the example of such a slide touch input. In this regard, according to the examples, not only an individual touch input but also a slide touch input can be sensed.

That is, the detector circuit 900 detects both individual touch input and slide touch input and thus can detect an individual touch detection signal TD (TD1 and TD2) and a slide touch detection signal SD (SD1 and SD2).

Figure 5:
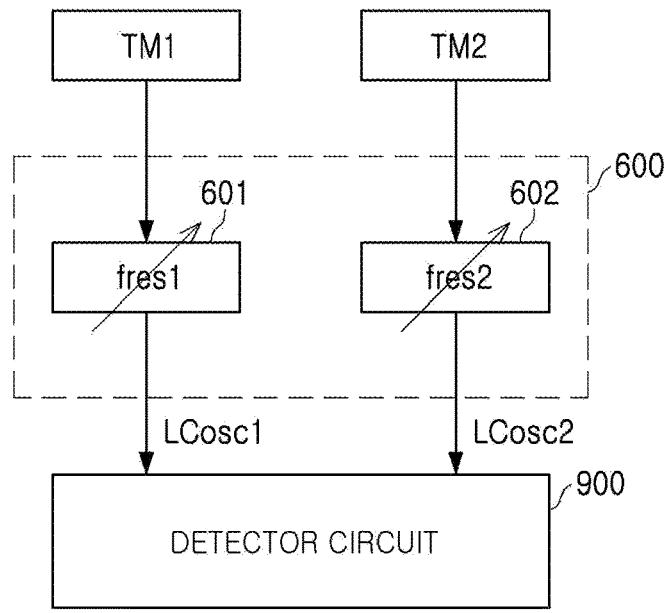
FIG. 5 illustrates an example oscillator circuit, in accordance with one or more embodiments.

FIG. 5 illustrates an example of an oscillator circuit, in accordance with one or more embodiments.

Referring to FIG. 5, the first oscillator circuit 601 may generate a first oscillation signal LCosc1 which has a first variable resonant frequency fres1 that is varied as inductance of the first inductor element LE1 varies when the first touch member TM1 is touched.

The second oscillator circuit 602 may generate a second oscillation signal LCosc2 which has a second resonant frequency fres2 that is varied as inductance of the second inductor element LE2 varies when the second touch member TM2 is touched.

Figure 6:
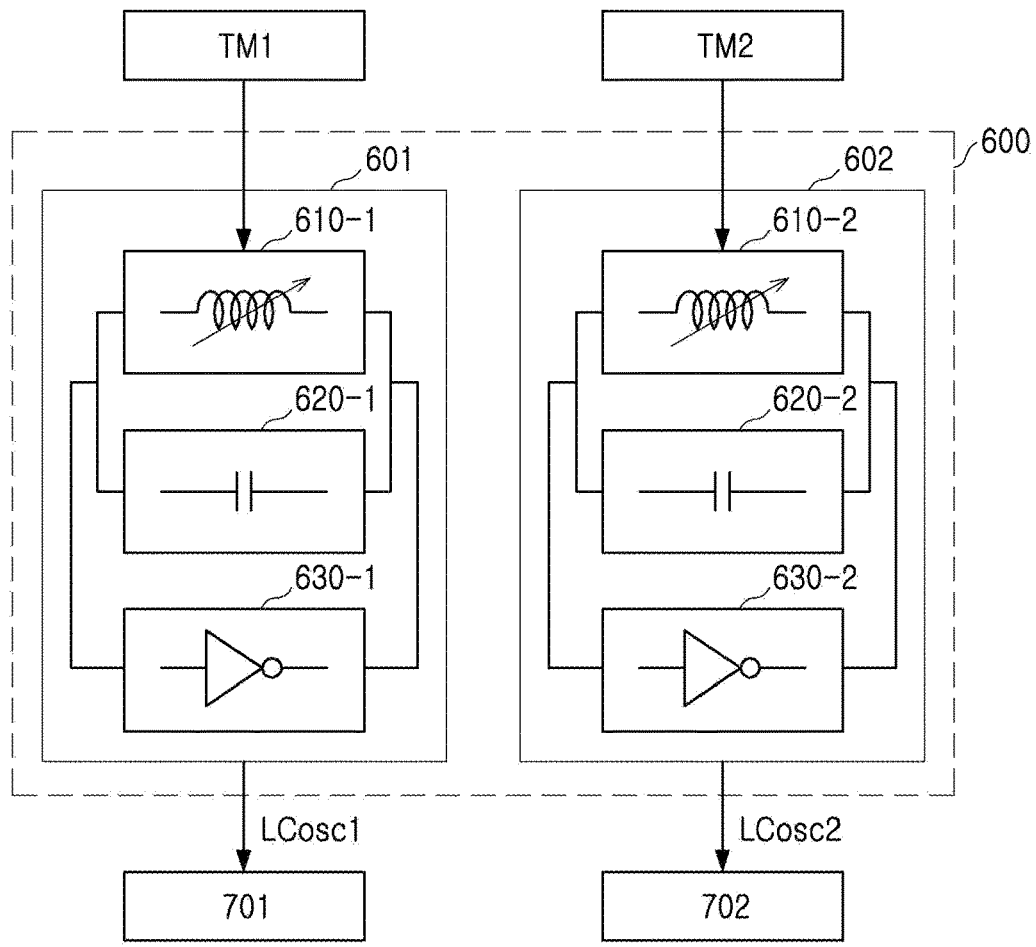
FIG. 6 illustrates an example oscillator circuit, in accordance with one or more embodiments.

FIG. 6 illustrates an example of an oscillator circuit, in accordance with one or more embodiments.

Referring to FIG. 6, the first oscillator circuit 601 may include a first inductance circuit 610-1, a first capacitance circuit 620-1 and a first amplification circuit 630-1.

The first inductance circuit 610-1 may include a first inductor element LE1 spaced apart from the inner side surface of the first touch member TM1 by a predetermined distance, and thus may include a variable inductance based on a touch input through the first touch member TM1.

The first capacitance circuit 620-1 may include capacitance for determining a resonance frequency, including a first capacitor element CE1 connected to the first inductance circuit 610-1.

The first amplification circuit 630-1 may generate a first oscillation signal LCosc1 having a first resonant frequency fres1 based on the first inductance circuit 610-1 and the first capacitance circuit 620-1. In an example, the first amplification circuit 630-1 may include at least one inverter or a differential amplification circuit, and is not limited to a particular circuit as long as the first oscillation signal is generated.

Additionally, the second oscillator circuit 620-2 may include a second inductance circuit 610-2, a second capacitance circuit 620-2 and a second amplification circuit 630-2.

The second inductance circuit 610-2 may include a second inductor element LE2 spaced apart from the inner side surface of the second touch member TM2 by a predetermined distance, and thus may include a variable inductance based on a touch input through the second touch member TM2.

The second capacitance circuit 620-2 may include a capacitance for determining a resonance frequency, including a second capacitor element CE2 connected to the second inductance circuit 610-2.

The second amplification circuit 630-2 may generate a second oscillation signal LCosc2 which has a second resonant frequency fres2 based on the second inductance circuit 610-2 and the second capacitance circuit 620-2. In an example, the second amplification circuit 630-2 may include at least one inverter or a differential amplification circuit, and is not limited to a particular circuit as long as the second oscillation signal LCosc2 is generated.

Referring to FIG. 6, an operation of the first oscillator circuit 601 when the first touch member TM1 is touched will be described.

Referring to FIGS. 2 to 6, the first oscillator circuit 601 may not have a variable inductance when a touch input is not sensed (no touch). The first oscillator circuit 601 may include a first inductance circuit 610-1 containing inductance Lind of the first inductor element LE1 and a first capacitance circuit 620-1 containing capacitance Cext of the first capacitor element CE1.

In an example, the first resonant frequency fres1 of the first oscillator circuit 601 may be represented by Equation 1 below, and the second resonant frequency fres2 of the second oscillator circuit 602 may be represented by Equation 2 below:

$$fres1 \approx 1/2\pi \ sqrt(Lind*Cext) \qquad \text{Equation 1:}$$

$$Fres2 \approx 1/2\pi \ sqrt(Lind*Cext) \qquad \text{Equation 2:}$$

In Equations 1 and 2 above, the symbol "≈" indicates that the elements may be the same as or similar to each other, and the configuration in which the elements are similar to each other may indicate that another value may be included.

Referring to FIG. 6, when a contact surface of the first touch member TM1 of the housing 500 of the electric device is touched, an inductive sensing method may be applied, and a touch input may be detected accordingly.

In an example, when the first touch member TM1 is touched by a conductor or a nonconductor, the first touch member TM1 is pushed and bent inwardly, thereby changing the initial distance between the first touch member TM1 and the first inductor element LE1. While a current flows through the first inductor element LE1, a distance to the first touch member TM1, a surrounding conductor, is changed, thereby changing a magnitude of the eddy current. The inductance generated by the changed eddy current is reduced (Lind−ΔLind), and the first resonant frequency fres1 may increase, thereby enabling the first touch input to be detected.

When a contact surface of the second touch member TM2 of the housing 500 of the electric device is touched, an inductive sensing method may be applied, and a touch input may be detected accordingly.

For example, when the second touch member TM2 is touched by a conductor or a nonconductor, the second touch member TM2 is pushed and bent inwardly, thereby changing the distance between the second touch member TM1 and the second inductor element LE2. While a current flows through the second inductor element LE2, a distance to the second touch member TM2, a surrounding conductor, is changed, thereby changing a magnitude of the eddy current. The inductance generated by the changed eddy current is reduced (Lind−ΔLind), and the second resonant frequency fres2 may increase, thereby enabling the second touch input to be detected.

Figure 7:
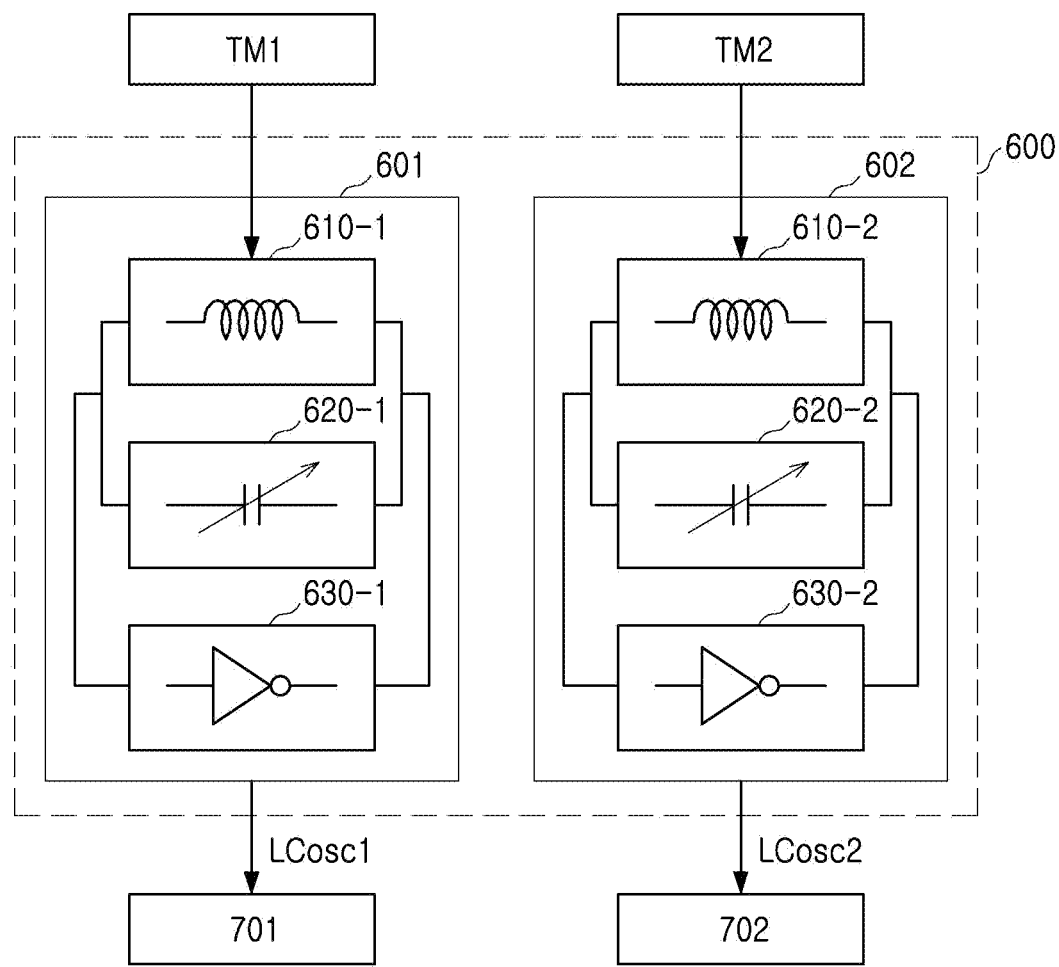
FIG. 7 illustrates an example oscillator circuit, in accordance with one or more embodiments.

FIG. 7 illustrates an example of an oscillator circuit, in accordance with one or more embodiments.

Referring to FIG. 7, the first oscillator circuit 601 may include a first inductance circuit 610-1, a first capacitance circuit 620-1, and a first amplification circuit 630-1.

The second oscillator circuit 602 may include a second inductance circuit 610-2, a second capacitance circuit 620-2, and a second amplification circuit 630-2.

A difference of the example of FIG. 7 from the example of FIG. 6 will be discussed. The first capacitance circuit 620-1 of the first oscillator circuit 601 has a variable capacitance that is varied according to a contact touch, while the second capacitance circuit 620-2 of the second oscillator circuit 602 has a variable capacitance that is varied according to a contact touch.

Figure 8:
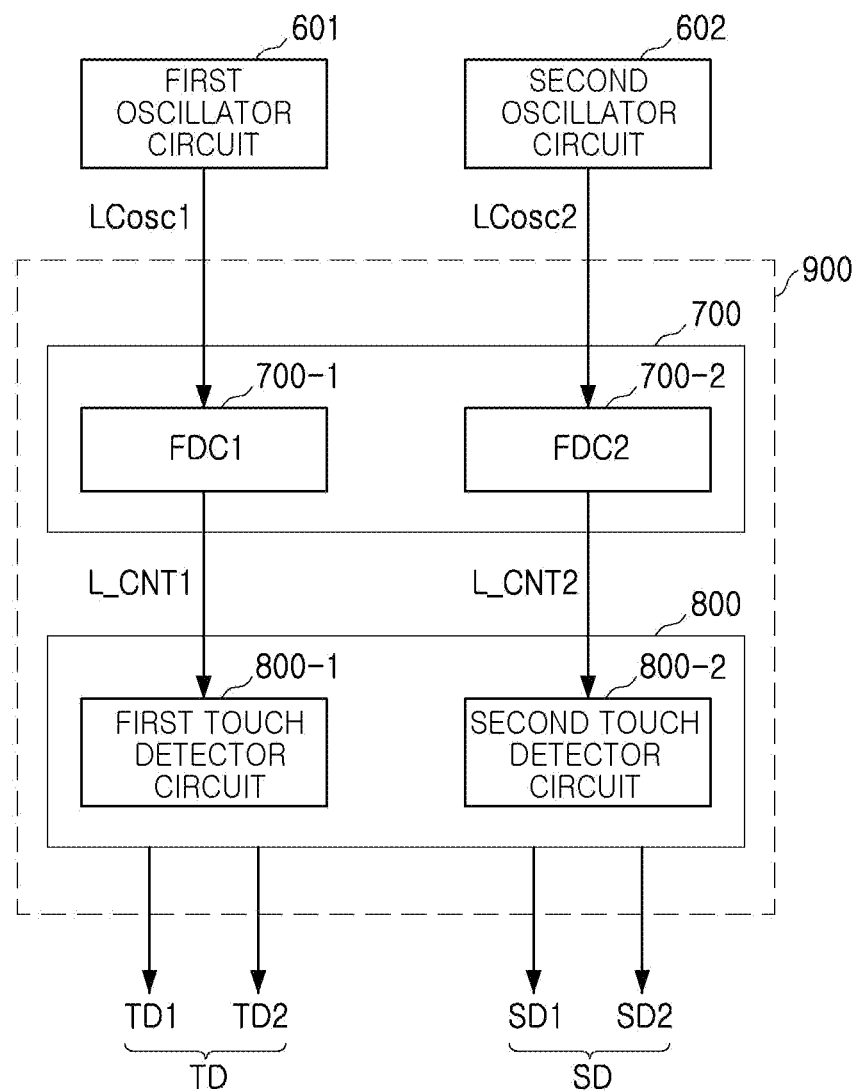
FIG. 8 illustrates an example detector circuit, in accordance with one or more embodiments.

FIG. 8 illustrates an example of a detector circuit, in accordance with one or more embodiments.

Referring to FIG. 8, the detector circuit 900 may include a frequency digital converter 700 and a touch detector circuit 800.

The frequency digital converter 700 may convert the first oscillation signal LCosc1 and the second oscillation signal LCosc2 to digital values to generate respective first and second count values L_CNT1 and L_CNT2. As an example, the frequency digital converter 700 may include a first frequency digital converter (FDC1) 700-1 and a second frequency digital converter (FDC2) 700-2.

The touch detector circuit 800 may detect one or more of an individual touch input or a slide touch input based on the first and second count values L_CNT1 and L_CNT2. In an example, the touch detector circuit 800 may detect a first touch input and a second touch input as well as a slide touch input based on the first and second count values L_CNT1 and L_CNT2 received from the respective first and second frequency digital converters 700-1 and 700-2. Accordingly, first and second touch detection signals TD1 and TD2 may be output, in addition to first and second slide touch detection signals SD1 and SD2.

In an example, the touch detector circuit 800 may include a first touch detector unit 800-1 and a second touch detector unit 800-2.

Figure 9:
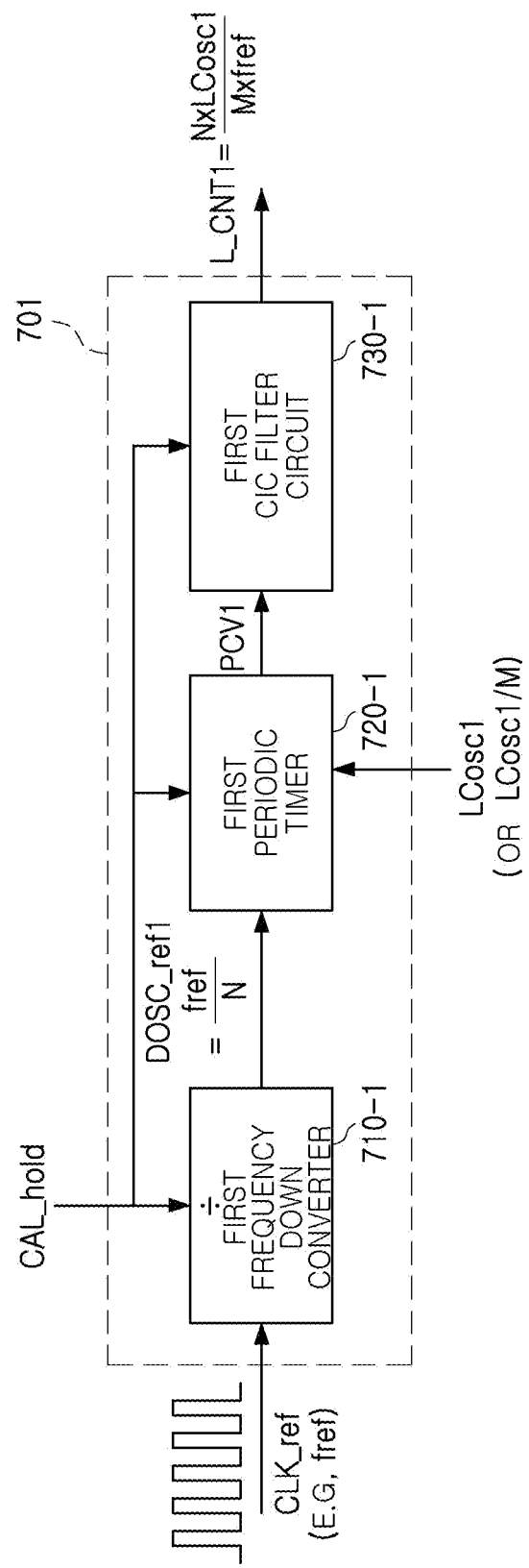
FIG. 9 illustrates an example first frequency digital converter, in accordance with one or more embodiments.

FIG. 9 illustrates an example of a first frequency digital converter, in accordance with one or more embodiments.

Referring to FIG. 9, the first frequency digital converter 701 may generate the first count value L_CNT1 by counting the first oscillation signal LCosc1.

For example, as shown in Equation 3 below, the first frequency digital converter 701 may divide a reference frequency by a reference frequency dividing ratio N and the first oscillation signal LCosc1 by a sensing frequency dividing ratio M to count the divided reference signal fref/N using the divided first oscillation signal LCosc1/M. Alternately, the divided first oscillation signal LCosc1/M is counted using the divided reference signal fref/N to output the first count value L_CNT1.

$$L\_CNT1=(N*LCosc1)/(M*fref) \quad \text{Equation 3:}$$

In Equation 3, the LCosc1 is a frequency of the first oscillation signal (first oscillation frequency) and the fref is a reference frequency while the N is a reference frequency (e.g., 32 Khz) dividing ratio and the M is a dividing ratio of a sensing resonant frequency.

As shown in Equation 3 above, dividing the first oscillation frequency LCosc1 by the reference frequency fref refers to counting a period of the reference frequency using the first oscillation frequency. When the first count value L_CNT1 is calculated by such method, it is advantageous in that a low reference frequency fref may be used and accuracy of the counting can be improved.

Referring to FIG. 9, the first frequency digital converter (FDC1) 701 may include, for example, a first frequency down converter 710-1, a first periodic timer 720-1, and a first cascaded integrator-comb (CIC) filter circuit 730-1.

The first frequency down converter 710-1 is configured to receive a reference clock CLK_ref, a reference to a periodic time of a timer to be counted, and lower a frequency of the reference clock CLK_ref.

In an example, the reference clock CLK_ref received in the first frequency down converter 710-1 may be any one of the first oscillation signal LCosc1 and the reference signal fref.

In an example, when the reference clock CLK_ref received in the first frequency down converter 710-1 is the first oscillation signal LCosc1, the first oscillation signal LCosc1 has a lowered frequency as in "DOSC_ref1=LSosc1/M", where the M may be preset in advance.

In an example, when the reference clock CLK_ref is the reference signal fref, the reference clock CLK_ref may have a lowered frequency as in "'DOSC_ref1=fref/N", where the N may be preset outside.

The first periodic timer 720-1 is configured to output a first period count value PCV1 produced by counting a first periodic time of the divided reference clock CLK_ref received from the first frequency down converter 710-1.

In an example, the first CIC filter circuit 730-1 may include a decimator CIC filter. The decimator CIC filter may output the first count value L_CNT1 by amplifying the received first period count value PCV1 using an accumulative gain.

For example, when the decimator CIC filter includes an integrating circuit, a decimator and a differential circuit, the accumulative gain may be calculated based on a stage order S of the integrating circuit, a decimator factor R, and a differential delay order M of the differential circuit as in [(R*M)^S]. In an example, when the stage order S of the integrating circuit is 4, the decimator factor R is 1 and the differential delay order M of the differential circuit is 4, the cumulative gain is 256 [(1*4)^4].

Figure 10:
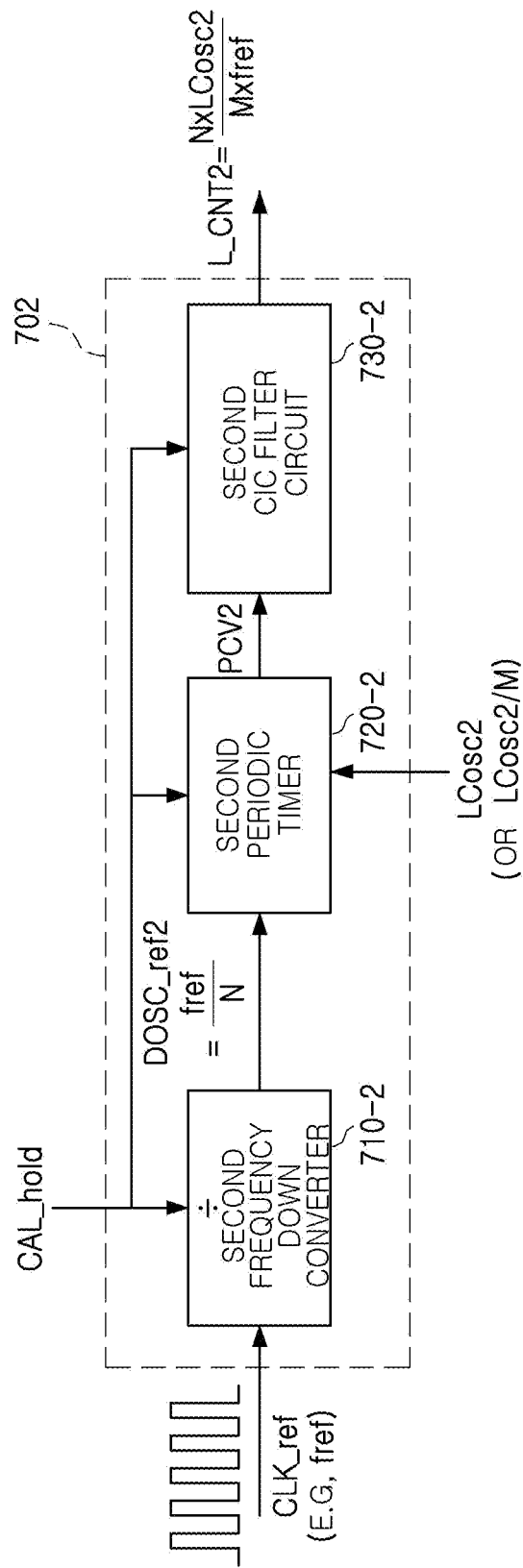
FIG. 10 illustrates an example of a second frequency digital converter of FIG. 8, in accordance with one or more embodiments.

FIG. 10 illustrates an example of a second frequency digital converter, in accordance with one or more embodiments.

Referring to FIG. 10, the second frequency digital converter (FDC2) 702 may include a second frequency down converter 710-2, a second periodic timer 720-2 and a second cascaded integrator-comb (CIC) filter circuit 730-2.

The second frequency down converter 710-2 performs the same operation as the first frequency down converter 710-1 of FIG. 9, and the second periodic timer 720-2 performs the same operation as the first periodic timer 720-1 of FIG. 9. The second cascaded integrator-comb (CIC) filter circuit 730-2 may perform the same operation as the first cascaded integrator-comb (CIC) filter circuit 730-1 of FIG. 9.

Through the performance of the same operations, the second frequency digital converter (FDC2) 702 may output the second count value L_CNT2.

Figure 11:
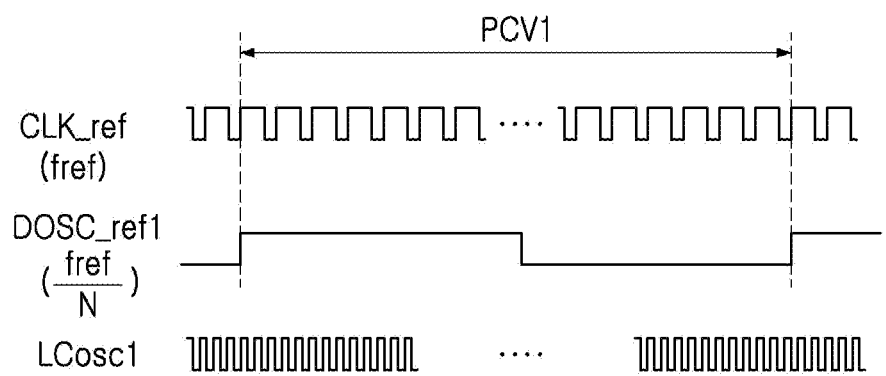
FIG. 11 illustrates an example of a portion of a signal of FIG. 9.

FIG. 11 illustrates an example of a portion of a signal of FIG. 9.

Referring to FIG. 11, as previously described, the reference clock CLK-ref may be any one of the first oscillation signal LCosc1 and the reference signal fref. The reference frequency signal fref may be a signal by an external crystal or an oscillation signal of an RC or a PPL of an IC.

As an example, when the reference clock CLK-ref is the reference signal fref, a sample clock CLK_sp1 may be the first oscillation signal LCosc1, which is the example in which a divided first reference clock DOSC_ref1 may be "fref/N."

Figure 12:
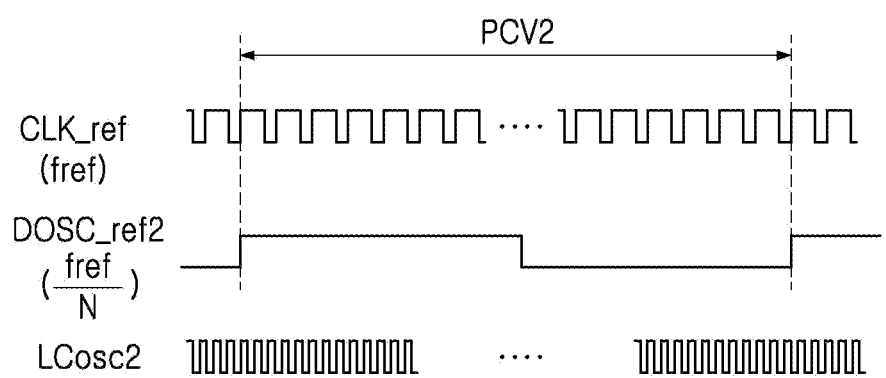
FIG. 12 illustrates an example of a portion of a signal of FIG. 10.

FIG. 12 illustrates an example of a portion of a signal of FIG. 10.

Referring to FIG. 12, as previously described, the reference clock CLK-ref may be any one of the second oscillation signal LCosc2 and the reference signal fref.

In an example, when the reference clock CLK-ref is the reference signal fref, the sample clock CLK_sp1 may be the second oscillation signal LCosc2, which is the example in which a divided second reference clock DOSC_ref2 may be "fref/N."

Figure 13A:
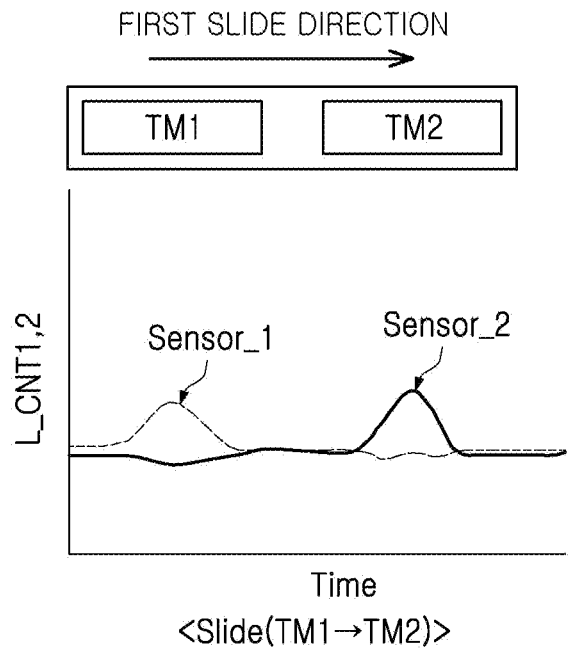
FIG. 13A illustrates an example of first and second count values obtained by a slide touch input in a first direction.
Figure 13B:
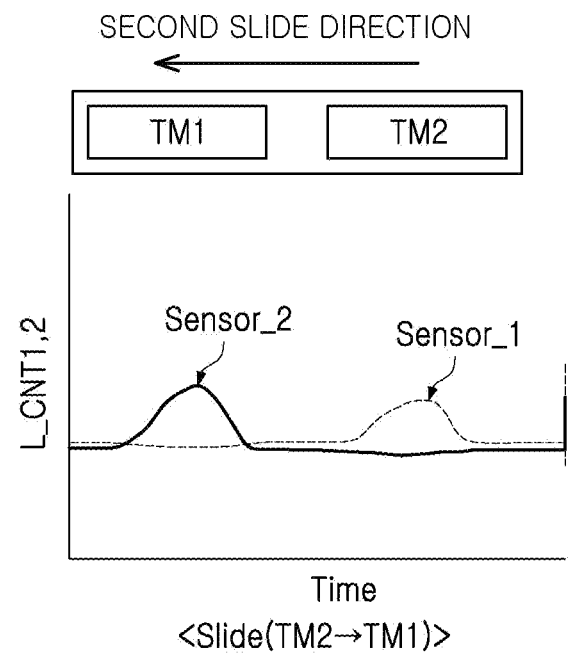
FIG. 13B illustrates an example of first and second count values obtained by a slide touch input in a second direction.

FIG. 13A illustrates an example of first and second count values obtained by a slide touch input in a first direction, and FIG. 13B illustrates an example of first and second count values obtained by a slide touch input in a second direction.

A process of detecting a slide touch input (e.g., a slide touch input based on a force touch) using two touch switches (including two touch members and two inductor elements) will be described based on FIGS. 13A, 13B, 14A and 14B.

Referring to FIGS. 13A and 13B, when the first and second touch members TM1 and TM2 are moved in a certain direction while being touched, a force touch applied to the two touch members TMI and TM2 may be sensed.

FIG. 13A illustrates waveforms of the first and second count values L_CNT1 and L_CNT2 that are based on an operation that is implemented when a force is applied to the first touch member TM1 (e.g., sensor_1) followed by the application of a force to the second touch member TM2 (e.g., sensor_2), that is, a slide touch input in a first direction. FIG. 13B illustrates waveforms of the first and second count values LCNT1 and L_CNT2 for an operation when a force is applied to the second touch member TM2 (e.g., sensor_2) followed by the application of a force to the first touch member TM1 (e.g., sensor_1), that is, a slide touch input in a second direction.

Referring to FIGS. 13A and 13B, in order to recognize the respective slide touches on the touch members TM1 and TM2 through the waveforms of the first and second count values L_CNT1 and L_CNT2, a touch slide may be recognized by a user by sensing that a waveform of a particular sensor (Sensor_1 or Sensor_2 in FIGS. 13A and 13B) increases, and a waveform of another sensor (Sensor_2 or Sensor_1) increases after a certain time. Such a sensing method may need a force equivalent to the force applied to the first sensor to push a case of the second sensor, thereby causing inconvenience to the user.

The Sensor_1 in FIGS. 13A and 13B may correspond to a sensor configuration including the first touch member TM1 and the first inductor element LE1 while the Sensor_2 may correspond to a sensor configuration including the second touch member TM2 and the second inductor element LE2.

Figure 14A:
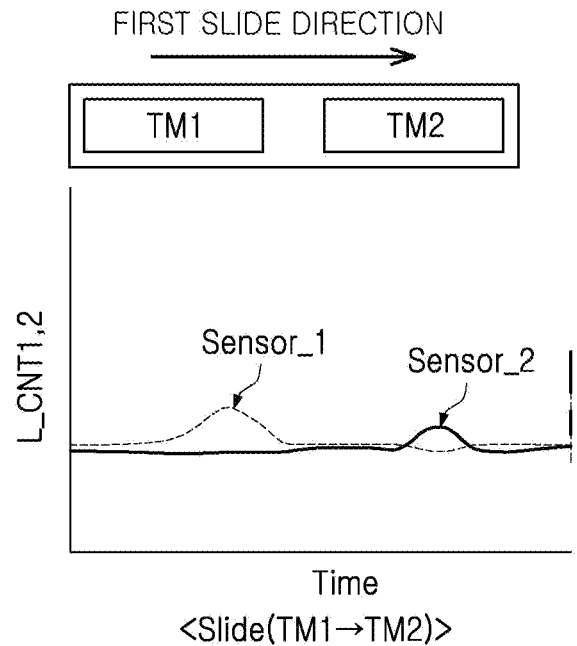
FIG. 14A illustrates an example of first and second count values obtained by a slide touch input in a first direction.
Figure 14B:
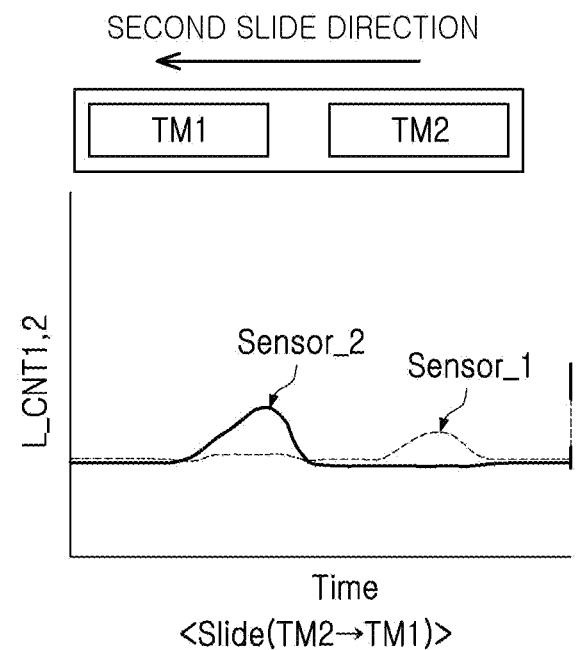
FIG. 14B illustrates an example of first and second count values obtained by a slide touch input in a second direction.

FIG. 14A illustrates an example of first and second count values obtained by a slide touch input in a first direction, and FIG. 14B is a diagram illustrating another example of first and second count values obtained by a slide touch input in a second direction.

Referring to FIGS. 14A and 14B, a light touch threshold, different from the heavier touch threshold, is set such that a slide touch input may be recognized even when a lighter force is applied to the second sensor (Sensor_1 or Sensor 2 of FIGS. 13A and 13B), in contrast to FIG. 13 in which the first and second sensors may need the same magnitude of a force to be applied, thereby enabling recognition of a simpler form of a slide.

Figure 15A:
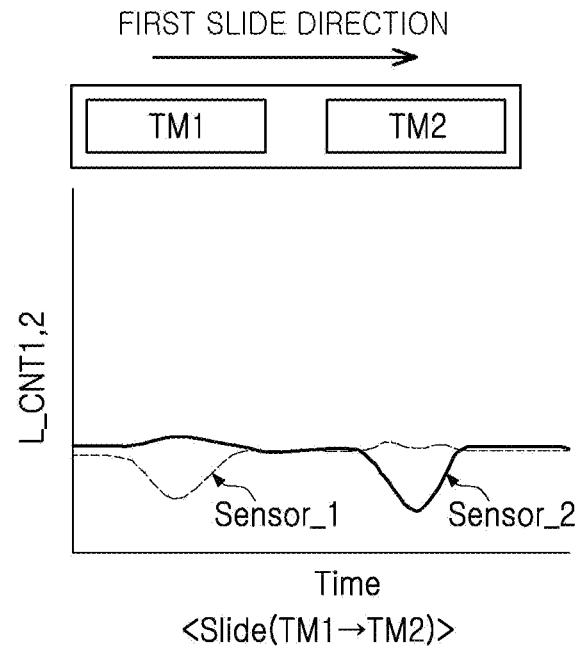
FIG. 15A illustrates an example of first and second count values obtained by a slide touch input in a first direction.
Figure 15B:
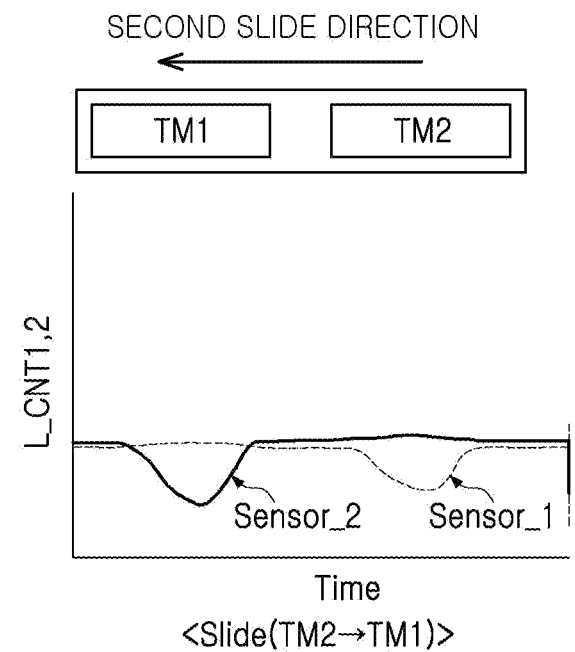
FIG. 15B illustrates an example of first and second count values obtained by a slide touch input in a second direction.

FIG. 15A illustrates an example of first and second count values obtained by a slide touch input in a first direction, and FIG. 15B illustrates an example of first and second count values obtained by a slide touch input in a second direction.

A process of detecting two touch switches (including two touch members and two inductor elements) will be described based on FIGS. 15A and 15B.

Referring to FIGS. 15A and 15B, when the first and second touch members TM1 and TM2 are moved in a certain direction while being touched without being applied with a force, a contact touch input applied through the two touch members TM1 and TM2 may be sensed.

FIG. 15A illustrates waveforms of the first and second count values L_CNT1 and L_CNT2 for an operation when the first touch member TM1 (e.g., sensor_1) is first touched and the second touch member TM2 (e.g., sensor_2) is then touched, that is, a slide touch input in a first direction, while FIG. 15B illustrates waveforms of the first and second count values L_CNT1 and L_CNT2 for an operation when the second touch member TM2 (e.g., sensor_2) is first touched and the first touch member TM1 (e.g., sensor_1) is then touched, that is, a slide touch input in a second direction.

Referring to FIGS. 15A and 15B, in order to recognize the slide touches through the waveforms of the first and second count values L_CNT1 and L_CNT2, a slide may be recognized by a user by sensing that a waveform of a particular sensor (Sensor_1 or Sensor_2 in FIGS. 13A and 13B) decreases and a waveform of another sensor (Sensor_2 or Sensor_1) decreases after a certain time.

The Sensor_1 in FIGS. 15A and 15B may correspond to a sensor configuration including the first touch member TM1 and the first inductor element LE1 while the Sensor_2 may correspond to a sensor configuration including the second touch member TM2 and the second inductor element LE2.

Figure 16:
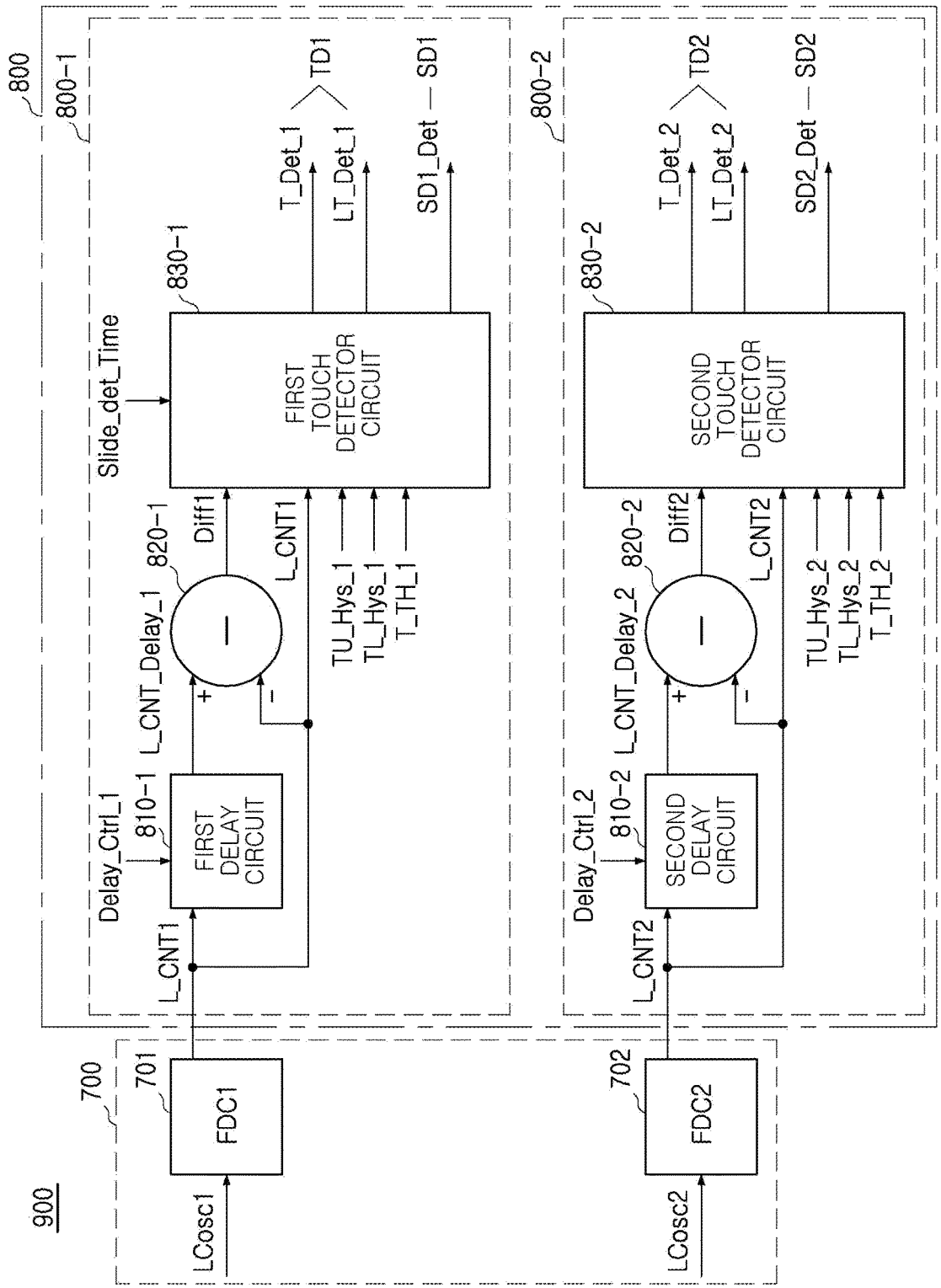
FIG. 16 illustrates an example of a detector circuit according, in accordance with one or more embodiments.

FIG. 16 illustrates an example of a detector circuit, in accordance with one or more embodiments.

Referring to FIG. 16, the first touch detector unit 800-1 may include a first delay circuit 810-1, a first subtraction circuit 820-1, and a first touch detector circuit 830-1.

The first delay circuit 810-1 may be configured to delay the first count value L_CNT1 according to a first delay control signal Delay Ctrl_1 by a predetermined time to output a first delay count value L_CNT_Delay_1. According to the first delay control signal Delay Ctrl_1, a delay time may be determined.

The first subtraction circuit 820-1 may be configured to subtract the first delay count value L_CNT_Delay_1 and the first count value L_CNT1 to output a first differential value Diff1. The first differential value Diff1 may be subject to a change in a slope of the first count value L_CNT1. The first count value L_CNT1 is a value which has been counted at a current time point, and the first delay count value L_CNT_Delay_1 is a value that may be counted a predetermined time before the current time point.

The first touch detector circuit 830-1 may be configured to detect an individual first touch input and a slide touch input in a first direction based on the first differential value Diff1 and a second differential value Diff2.

The second touch detector unit 800-2 may include a second delay circuit 810-2, a second subtraction circuit 820-2 and a second touch detector circuit 830-2.

The second delay circuit 810-2 may be configured to delay the second count value L_CNT2 according to a second delay control signal Delay Ctrl_21 by a predetermined time to output a second delay count value L_CNT_Delay_2. According to the second delay control signal Delay Ctrl_2, a delay time may be determined.

The second subtraction circuit 820-2 may be configured to subtract the second delay count value L_CNT_Delay_2 and the second count value L_CNT2 to output the second differential value Diff2. The second differential value Diff2 may be subject to a change in a slope of the second count value L_CNT2. The second count value L_CNT2 is a value which has been counted at a current time point, and the second delay count value L_CNT_Delay_2 is a value counted a predetermined time before the current time point.

The second touch detector circuit 830-2 may be configured to detect an individual second touch input and a slide touch input in a second direction based on the first and second differential values Diff1 and Diff2.

In an example, the first touch detector circuit 830-1 may be configured to compare the first differential value Diff1 with a first touch threshold T_TH_1 and a first light touch threshold LTT_TH_1 below the first touch threshold T_TH_1 to generate a first touch detection signal LT_Det_1, and detect an individual touch input based on the first touch threshold T_TH_1. The first touch detector circuit 830-1 may also detect the slide touch input in the first direction (TM1→TM2) based on the first touch threshold T_TH_1 and a second light touch detection signal LT_Det_2.

For example, the first touch detector circuit 830-1 may recognize a first touch input when the first differential value Diff1 is larger than the first touch threshold T_TH_1 of first touch section T_TH_1, TU_Hys_1 and TL_Hys_1 and output a high level of a first touch detection signal T_Det1. In an example, the first touch input may be recognized when the first differential value Diff1 is a positive number and a magnitude thereof is larger than that of the first touch threshold T_TH_1.

In contrast, when the first differential value Diff1 is smaller than the first touch threshold T_TH_1, a "No Touch" may be recognized, and a low level of the first touch detection signal T_Det1 may be output. In an example, a "No Touch" can be recognized when the first differential value Diff1 is a negative number and a magnitude thereof is smaller than that of the first touch threshold T_TH_1.

In the first touch intervals T_TH_1, TU_Hys_1 and TL_Hys_1, the T_TH_1 refers to the first touch threshold, and the TU_Hys_1 and the TL_Hys_1 refer to upper and lower limits of first touch hysteresis, respectively.

In an example, the second touch detector circuit 830-2 is configured to compare the second differential value Diff2 with a second touch threshold T_TH_2 and a second light touch threshold LTT_TH_2 below the second touch threshold T_TH_2 to generate a second touch detection signal LT_Det_2, and detect an individual touch input based on the second touch threshold T_TH_2. The second touch detector circuit 830-2 also detects the slide touch input in the second direction (TM2→TM1) based on the second touch threshold T_TH_2 and a first light touch detection signal LT_Det_1.

For example, the second touch detector circuit 830-2 may recognize a second touch input when the second differential value Diff2 is larger than the second touch threshold T_TH_2 of second touch intervals T_TH_2, TU_Hys_2 and TL_Hys_2 and output a high level of a second touch detection signal T_Det2. In an example, the second touch input can be recognized when the second differential value Diff2 is a positive number and a magnitude thereof is larger than a magnitude of the second touch threshold T_TH_2.

In contrast, when the second differential value Diff2 is smaller than the second touch threshold T_TH_2, a "No Touch" may be recognized, and a low level of the second touch detection signal T_Det2 may be output. In an example, a "No Touch" may be recognized when the second differential value Diff2 is a negative number and a magnitude thereof is smaller than a magnitude of the second touch threshold T_TH_2.

In the second touch intervals T_TH_2, TU_Hys_2 and TL_Hys_2, the T_TH_2 refers to the second touch threshold, and the TU_Hys_2 and the TL_Hys_2 refer to upper and lower limits of second touch hysteresis, respectively.

In an example, a slide touch input may be recognized based on a high level of each of the first and second touch detection signals T_Det_1 and T_Det_2, and a slide direction may be recognized based on an order of being input. First and second slide touch detection signals SD1 and SD2 may be output based on a sensing of the slide touch input.

As previously described, use of the first and second differential values Diff1 and Diff2 for the slope may prevent an error of a temperature drift, and use of the first and second touch intervals T_TH_1, TU_Hys_1 and TL_Hys_1 and T_TH_2, TU_Hys_2 and TL_Hys_2 may improve the accuracy of the touch sensing.

Figure 17:
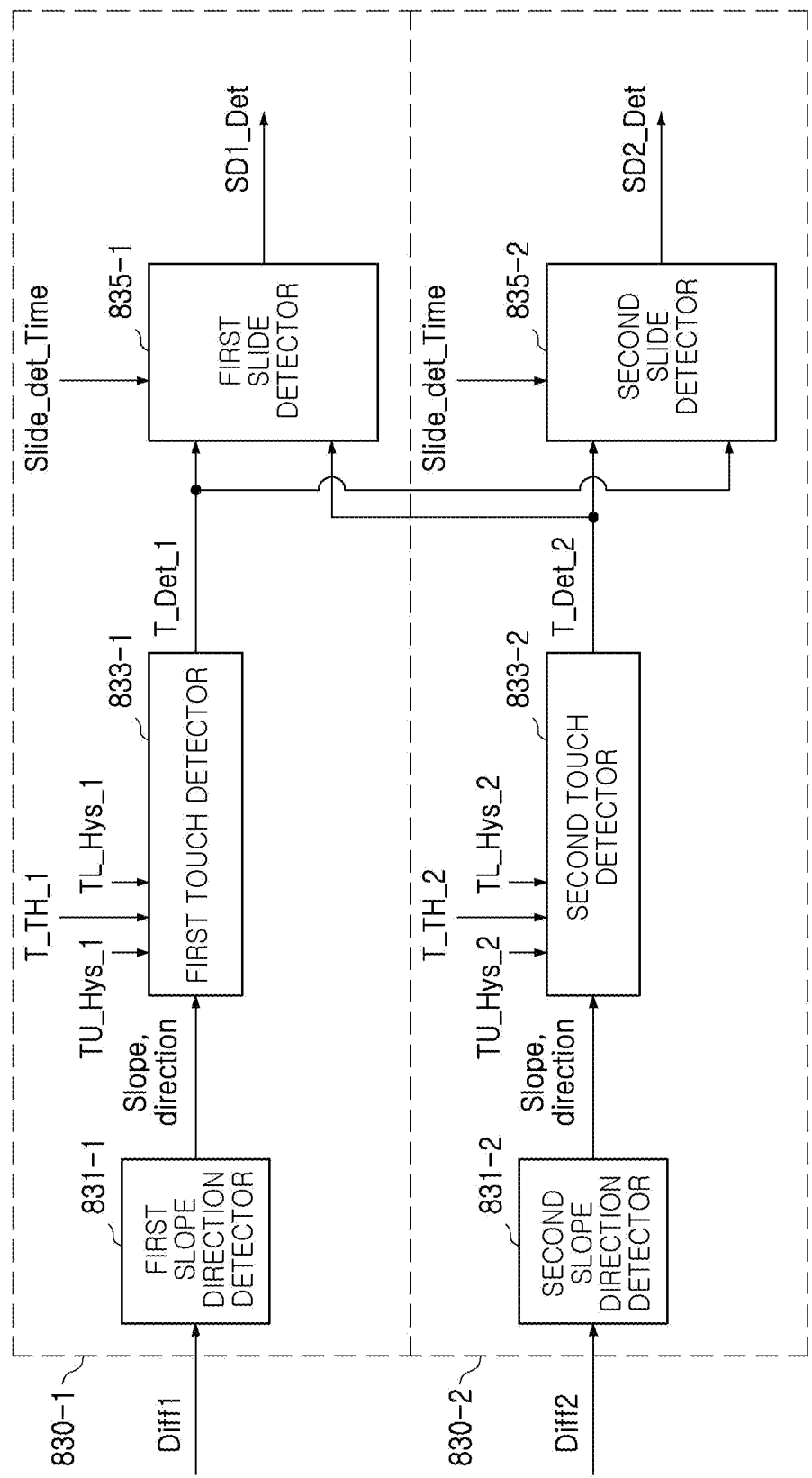
FIG. 17 illustrates an example of the first and second touch detectors of FIG. 16, in accordance with one or more embodiments.

FIG. 17 illustrates an example of the first and second touch detectors of FIG. 16.

Based on FIG. 17, the first touch detector circuit 830-1 may include a first slope_direction detector 831-1, a first touch detector 833-1 and a first slide detector 835-1.

The second touch detector circuit 830-2 may include a second slope_direction detector 831-2, a second touch detector 833-2 and a second slide detector 835-2.

The first slope_direction detector 831-1 is configured to detect a size and a direction of a first touch slope based on the first differential value Diff1, a slope value.

The first touch detector 833-1 is configured to recognize that a touch is sensed when the first touch slope is above the first touch threshold T_TH_1 in an ascending direction based on the size and the direction of the slope from the first slope_direction detector 831-1 and output a first touch detection signal T_Det_1. While having the first touch recognized, the first touch detector 833-1 may recognize that the first touch detection is removed when the first touch slope is above the first touch threshold T_TH_1 in a descending direction. Use of the upper value of the first hysteresis TU_Hys_1 and the lower value of the first hysteresis TL_Hys_1 close to the first touch threshold T_TH_1, in addition to the first touch threshold T_TH_1, for stability facilitates determination of the first touch input or cancellation thereof.

The second slide detector 835-2 is configured to recognize a second slide touch input (TM2 to TM1) based on the first touch detection signal T_Det_1 from the first touch detector 833-1 and the second touch detection signal T_Det_2 from the first touch detector 833-2 to output the second slide touch detection signal SD2.

The second slope_direction detector 831-2 is configured to detect a size and a direction of a second touch slope based on the second differential value Diff2, a slope value.

The second touch detector 833-2 is configured to recognize that a touch is sensed when the second touch slope is above the second touch threshold T_TH_2 in an ascending direction based on the size and the direction of the slope from the second slope_direction detector 831-2 and output a second touch detection signal T_Det_2. While having the second touch recognized, the second touch detector 833-2 recognizes that the second touch detection is removed when the second touch slope is above the second touch threshold T_TH_2 in a descending direction. Use of the upper value of the second hysteresis TU_Hys_2 and the lower value of the second hysteresis TL_Hys_2 close to the second touch threshold T_TH_2, in addition to the second touch threshold T_TH_2, for stability facilitates determination of the second touch input or cancellation thereof.

The first slide detector 835-1 may be configured to recognize a first slide touch input (TM1 to TM2) based on the first touch detection signal T_Det_1 from the first touch detector 833-1 and the second touch detection signal T_Det_2 from the first touch detector 833-2 to output the first slide touch detection signal SD1.

FIG. 18 illustrates an example of the first and second touch detectors of FIG. 16.

Referring to FIG. 18, first and second touch detector circuits 830-1 and 830-2 of FIG. 18, in contrast to the first and second touch detector circuits 830-1 and 830-2, may further include a first light touch detector 834-1 and a second light touch detector 834-2, respectively.

In comparison with the first and second touch detector circuits 830-1 and 830-2, the first and second light touch detectors 834-1 and 834-2 may sense a light touch for a simple and convenient slide, and may be set with first and second light touch thresholds LTT_TH_1 and LT_TH_2 that are lower than the first and second touch thresholds T_TH_1 and T_TH_2.

Accordingly, the first light touch detector 834-1 is configured to output a first light touch detection signal LT_Det_1 when a slope size of the first differential value Diff1 is in the ascending direction and is larger than a slope size of the first light touch threshold LTT_TH_1.

The second light touch detector 834-2 is configured to output a second light touch detection signal LT_Det_2 when a slope size of the second differential value Diff2 is in the ascending direction and is larger than that of the second light touch threshold LTT_TH_2.

The first slide detector 835-1 may then recognize the first slide touch input (TM1 to TM2) based on the first touch detection signal T_Det_1 from the first touch detector 833-1 and a second light touch detection signal LT_Det_2 from the second light touch detector 834-2.

The second slide detector 835-2 may then recognize the second slide touch input (TM2 to TM1) based on the second touch detection signal T_Det_2 from the second touch detector 833-2 and a first light touch detection signal LT_Det_1 from the first light touch detector 834-1.

Figure 19:
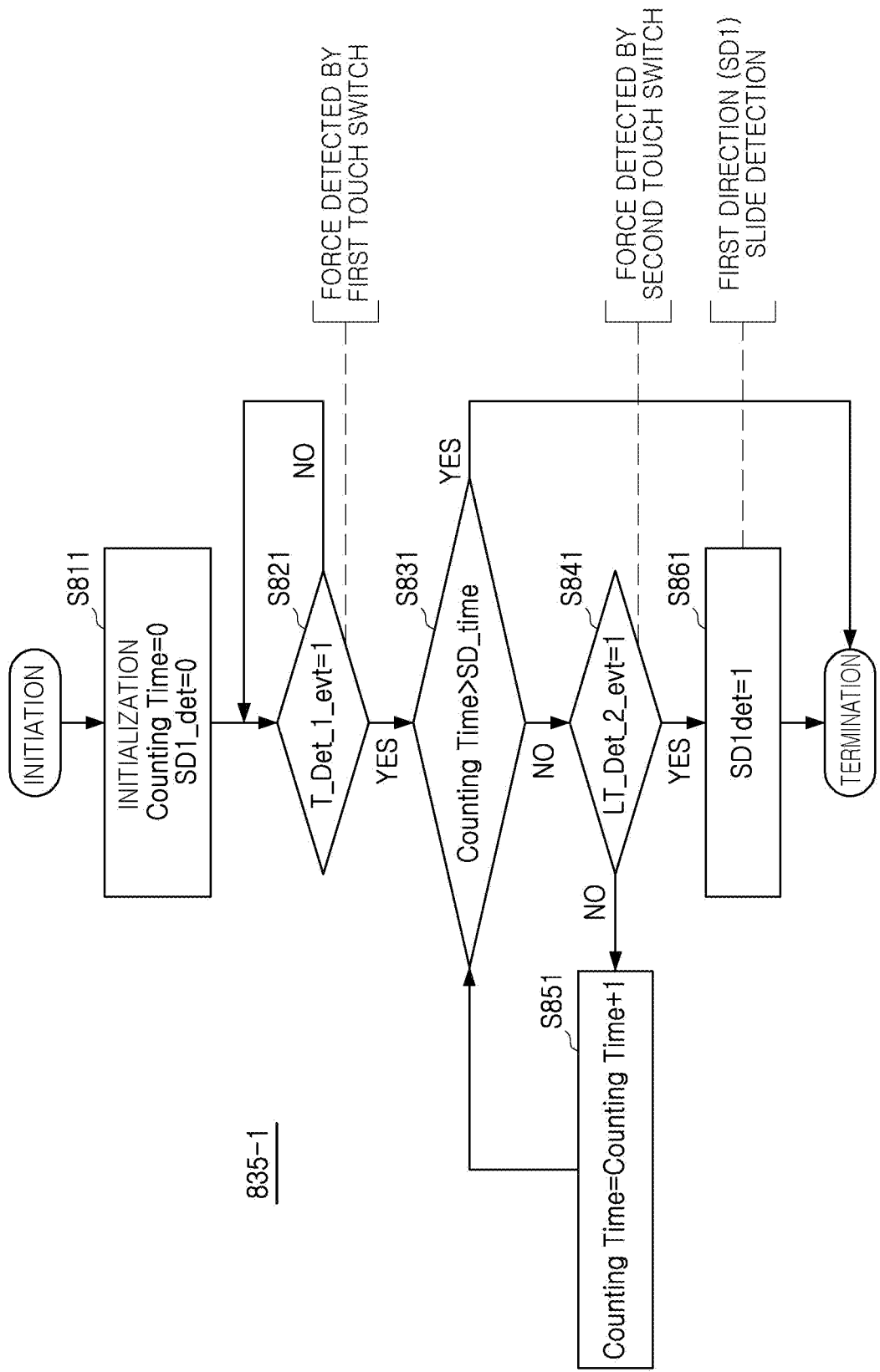
FIG. 19 illustrates an example of an operation of a first slide detector, in accordance with one or more embodiments.

FIG. 19 illustrates an example of an operation of a first slide detector of FIG. 18.

An operational process of the first slide detector 835-1 will be described based on FIG. 19.

When the operation initiates, a counting time of a time counter and a slide detection signal TM1 to TM2_slide (SD1)_det are set to 0 (S811), followed by observing whether a touch input by the first touch member TM1 is sensed (T_Det_1_evt=1) (S821). When a touch input by the first touch member TM1 (e.g., first touch switch) is sensed, a determination is made whether the counting time of the time counter exceeds a predetermined time (Slide_det_time, SD_time) (S831), and the operation is terminated if the counting time exceeds the predetermined time. When the counting time does not exceed the predetermined time, a determination is made whether a touch input by the second touch member TM2 is sensed (LT_Det_2_evt=1) (S841). When a touch input by the second touch member TM2 is sensed, a slide touch is sensed (TM1 to TM2_slide (SD1)_det=1) (S861). When a touch input by the second touch member TM2 is not sensed, the counting time is increased (S851) while being on standby until the touch by the second touch member TM2 is sensed.

Figure 20:
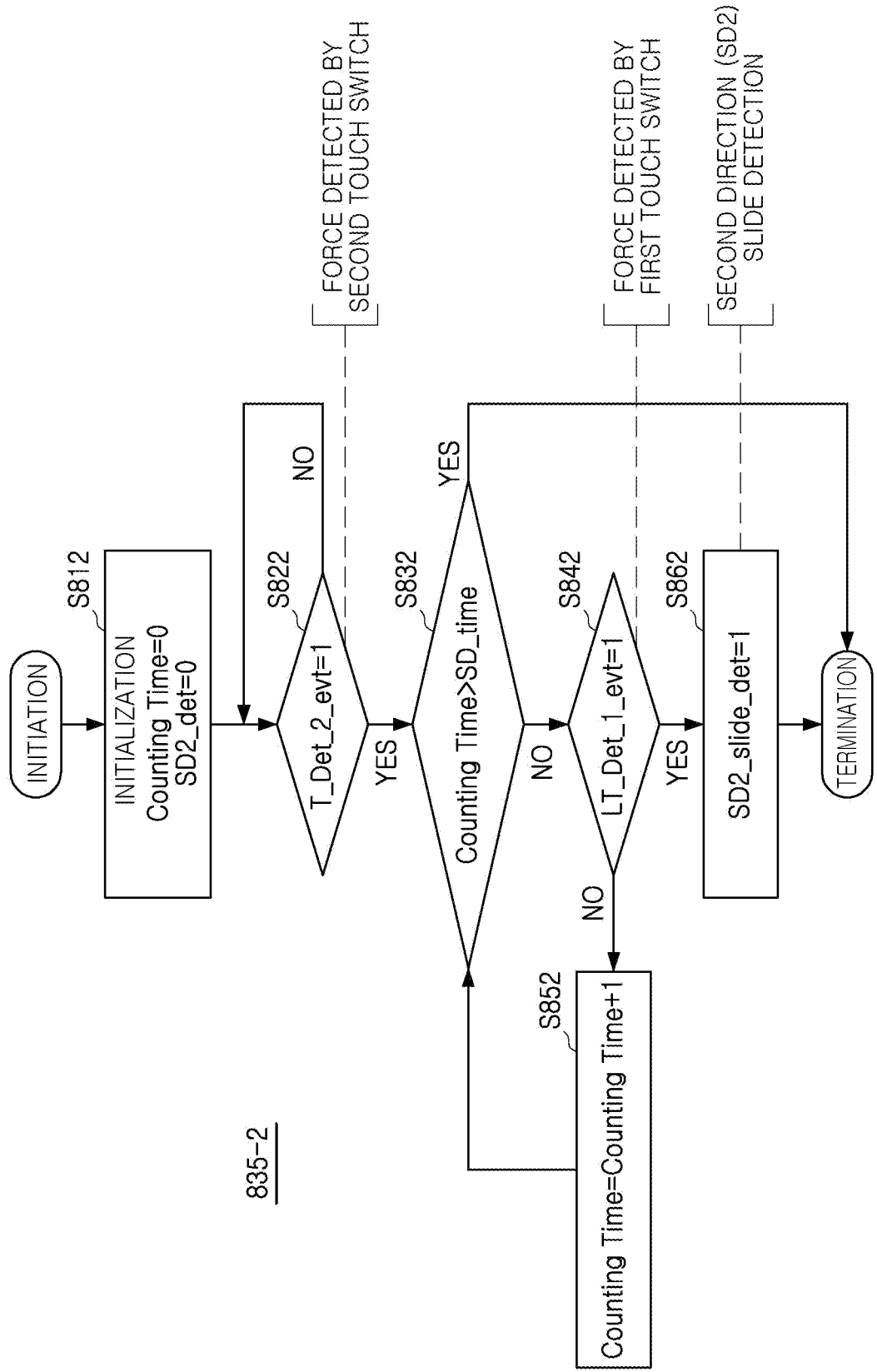
FIG. 20 illustrates an example of an operation of a second slide detector, in accordance with one or more embodiments.

FIG. 20 illustrates an example of operation of a second slide detector of FIG. 18.

An operational process of the second slide detector 835-2 will be described based on FIG. 20.

When the operation initiates, a counting time of a time counter and a slide detection signal TM1 to TM2_slide (SD2)_det are set to 0 (S812), followed by determining whether a touch input by the second touch member TM2 is sensed (T_Det_2_evt=1) (S822). When a touch input by the second touch member TM2 is sensed, a determination is made whether the counting time of the time counter exceeds a predetermined time (Slide_det_time, SD_time) (S832) is observed to terminate the operation if the counting time exceeds the predetermined time. When the counting time does not exceed the predetermined time, a determination is made whether a touch input by the first touch member TM1 is sensed (LT_Det_1_evt=1) (S842). When a touch input by the first touch member TM1 is sensed, a slide touch is sensed (TM2 to TM1_slide (SD2)_det=1) (S862). When a touch input by the first touch member TM1 is not sensed, the counting time is increased (S852) while being on standby until the touch by the first touch member TM1 is sensed.

When the example embodiments above are applied to a mobile device, not only an individual touch input can be recognized through at least two touch members, but also a slide touch input can be recognized. Accordingly, touch inputs can be utilized for various purposes.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A touch sensing device configured to be added to an electronic device, the electronic device comprising a touch switching unit, the touch switching unit comprising a first touch member and a second touch member, the touch sensing device comprising:
an oscillator circuit configured to generate a first oscillation signal having a variable resonant frequency based on an application of a touch to the first touch member, and generate a second oscillation signal having a variable resonant frequency based on an application of a touch to the second touch member; and
a detector circuit configured to:
generate a first count value by converting the first oscillation signal to a first digital value, and generate a second count value by converting the second oscillation signal to a second digital value,
detect an individual touch input based on the first count value and the second count value, and
detect a slide touch input when a first touch input to the first touch member and a second touch input to the second touch member are detected within a predetermined slide reference time.

2. The device of claim 1, wherein the oscillator circuit comprises:
a first oscillator circuit comprising a first inductance circuit disposed in an inner side of the first touch member and configured to have a variable inductance when the first touch member is force-touched, and a first capacitance circuit disposed in the inner side of the first touch member and configured to have a variable capacitance when the first touch member is force-touched; and
a second oscillator circuit comprising a second inductance circuit disposed in an inner side of the second touch member and configured to have a variable inductance when the second touch member is force-touched, and a second capacitance circuit disposed in the inner side of the second touch member and configured to have a variable capacitance when the second touch member is force-touched,
wherein the first oscillator circuit further comprises a first inductor element and a first capacitor element connected to the first inductor element and configured to generate the first oscillation signal, and
the second oscillator circuit further comprises a second inductor element and a second capacitor element connected in parallel to the second inductor element and configured to generate the second oscillation signal.

3. The device of claim 2, further comprising:
a substrate on which the oscillator circuit and a circuit unit comprising the detector circuit are mounted; and
a bracket configured to support the substrate such that a predetermined distance between the first inductor element and the first touch member, and a predetermined distance between the second inductor element and the second touch member are maintained.

4. The device of claim 3, wherein the detector circuit is configured to detect the slide touch based on the first count value and the second count value when the first touch input and the second touch input are respectively detected by the first touch member and the second touch member within the predetermined slide reference time,
wherein, among a preceding touch threshold and a following touch threshold for respectively determining a preceding touch input and a following touch input during the first touch input and the second touch input, the following touch threshold is lower than the preceding touch threshold.

5. The device of claim 4, wherein the detector circuit comprises:
a frequency digital converter configured to respectively convert the first oscillation signal and the second oscillation signal to digital values to generate the first count value and the second count value; and
a touch detector circuit configured to detect an individual touch input or a slide touch input based on the generated first count value and the generated second count value.

6. The device of claim 5, wherein the frequency digital converter comprises a first frequency digital converter and a second frequency digital converter,
wherein the first frequency digital converter comprises:
a first frequency down converter configured to divide a received reference clock and lower a frequency of the received reference clock;
a first periodic timer configured to generate a first period count value by counting a first periodic time of the divided reference clock by counting with the first oscillation signal; and
a first cascaded integrator-comb (CIC) filter circuit configured to generate the first count value by amplifying the first periodic count value with an accumulative gain, and
the second frequency digital converter comprises:
a second frequency down converter configured to divide the received reference clock and lower a frequency of the received reference clock;
a second periodic timer configured to generate a second period count value by counting a first periodic time of the divided reference clock received from the second frequency-lowering converter by counting with the second oscillation signal; and
a second CIC filter circuit configured to generate the second count value by amplifying the second periodic count value with an accumulative gain.

7. The device of claim 5, wherein the touch detector circuit comprises a first touch detector unit and a second touch detector unit,
wherein the first touch detector unit comprises:
a first delay circuit configured to output a first delay count value by delaying the first count value by a predetermined period of time according to a first delay control signal;
a first subtraction circuit configured to output a first differential value by subtracting the first delay count value and the first count value; and
a first touch detector circuit configured to individually detect the first touch input and a slide touch input in a first direction based on the first differential value and a second differential value; and
the second touch detector unit comprises:
a second delay circuit configured to output a second delay count value by delaying the second count value by a predetermined period of time according to a second delay control signal;
a second subtraction circuit configured to output a second differential value by subtracting the second delay count value and the second count value; and
a second touch detector circuit configured to individually detect a second touch input and a slide touch input in a second direction based on the first differential value and the second differential value.

8. The device of claim 7, wherein:
the first touch detector circuit is configured to compare the first differential value with a first touch threshold and a first light touch threshold that has a value less than the first touch threshold to generate a first touch detection signal, to detect the individual touch input based on the first touch threshold, and detect the slide touch input in the first direction based on the first touch threshold and a second light touch detection signal, and the second touch detector circuit is configured to compare the second differential value with a second touch threshold and a second light touch threshold that has a value less than the second touch threshold to generate a second touch detection signal, to detect an individual touch input based on the second touch threshold and detect the slide touch input in the second direction based on the second touch threshold and a first light touch detection signal.

9. An electric device, comprising:
a housing;
a touch switching unit formed in the housing and comprising a first touch member and a second touch member;
an oscillator circuit configured to generate a first oscillation signal having a variable resonant frequency based on an application of a touch to the first touch member, and generate a second oscillation signal having a variable resonant frequency based on an application of a touch to the second touch member; and
a detector circuit configured to generate a first count value by converting the first oscillation signal to a first digital value, and generate a second count value by converting the second oscillation signal to a second digital value, detect an individual touch input based on the first count value and the second count value, and detect a slide touch input when a first touch input to the first touch member and a second touch input to the second touch member are detected within a predetermined slide reference time.

10. The device of claim 9, wherein the oscillator circuit comprises:
a first oscillator circuit comprising a first inductance circuit disposed in an inner side of the first touch member and configured to have a variable inductance when the first touch member is force-touched, and a first capacitance circuit disposed in the inner side of the first touch member and configured to have a variable capacitance when the first touch member is force-touched; and
a second oscillator circuit comprising a second inductance circuit disposed in an inner side of the second touch member and configured to have a variable inductance when the second touch member is force-touched, and a second capacitance circuit disposed in the inner side of the second touch member and configured to have a variable capacitance when the second touch member is force-touched,
wherein the first oscillator circuit further comprises a first inductor element and a first capacitor element connected to the first inductor element and configured to generate the first oscillation signal, and
the second oscillator circuit further comprises a second inductor element and a second capacitor element connected in parallel to the second inductor element and configured to generate a second oscillation signal.

11. The device of claim 10, further comprising:
a substrate on which the oscillator circuit and a circuit unit comprising the detector circuit are mounted; and
a bracket configured to support the substrate such that a predetermined distance between the first inductor element and the first touch member, and a predetermined distance between the second inductor element and the second touch member are maintained.

12. The device of claim 10, wherein the detector circuit is configured to detect the slide touch based on the first count value and the second count value when the first touch input and the second touch input are respectively detected by the first touch member and the second touch member, within the predetermined slide reference time,
wherein, among a preceding touch threshold and a following touch threshold for respectively determining a preceding touch input and a following touch input during the first touch input and the second touch input, the following touch threshold is lower than the preceding touch threshold.

13. The device of claim 12, wherein the detector circuit comprises:
a frequency digital converter configured to respectively convert the first oscillation signal and the second oscillation signal to digital values to generate the first count value and the second count value; and
a touch detector circuit configured to detect an individual touch input or a slide touch input based on the generated first count value and the generated second count value.

14. The device of claim 13, wherein the frequency digital converter comprises a first frequency digital converter and a second frequency digital converter,
wherein the first frequency digital converter comprises:
a first frequency down converter configured to divide a received reference clock and lower a frequency of the received reference clock;
a first periodic timer configured to generate a first period count value by counting a first periodic time of the divided reference clock by counting with the first oscillation signal; and
a first cascaded integrator-comb (CIC) filter circuit configured to generate the first count value by amplifying the first periodic count value with an accumulative gain, and
the second frequency digital converter comprises:
a second frequency down converter configured to divide the received reference clock and lower a frequency of the received reference clock;
a second periodic timer configured to generate a second period count value by counting a first periodic time of the divided reference clock received from the second frequency-lowering converter by counting with the second oscillation signal; and
a second CIC filter circuit configured to generate the second count value by amplifying the second periodic count value with an accumulative gain.

15. The device of claim 13, wherein the touch detector circuit comprises:
a first delay circuit configured to output a first delay count value by delaying the first count value by a predetermined period of time according to a first delay control signal;
a second delay circuit configured to output a second delay count value by delaying the second count value by a predetermined period of time according to a second delay control signal;

a first subtraction circuit configured to output a first differential value by subtracting the first delay count value and the first count value; and a second subtraction circuit configured to output a second differential value by subtracting the second delay count value and the second count value; and a touch detector circuit configured to individually detect the first touch input and a slide touch input in a first direction based on the first differential value and a second differential value.

16. The device of claim 15, wherein the force detector circuit is configured to:

compare the first differential value with a first touch threshold and a first light touch threshold that has a value less than the first touch threshold to generate a first touch detection signal, compare the second differential value with a second touch threshold and a second light touch threshold that has a value less than the second touch threshold to generate a second touch detection signal, and detect an individual touch input based on the first touch threshold and the second touch detection signal, detect the slide touch input in the first direction based on the first touch threshold and a second light touch detection signal, and detect the slide touch input in the second direction based on the second touch threshold and a first light touch detection signal.

17. A method comprising:

receiving touch inputs at a first touch member and a second touch member;

generating a first oscillation signal and a second oscillation signal based on the received touch inputs;

generating a first count value and a second count value respectively based on the first oscillation signal and the second oscillation signal;

detecting an individual touch based on the first count value and the second count value; and detecting a slide touch input based on a detection of touch inputs to the first touch member and the second touch member within a predetermined slide reference time.

18. The method of claim 17, further comprising recognizing a first slide touch input based on a first touch detection signal from a first touch detector and a second light touch detection signal from a second light touch detector, and recognizing a second slide touch input based on a second touch detection signal from a second touch detection signal and a first light detection signal from a first light touch detector.

* * * * *